United States Patent
Edge et al.

(10) Patent No.: US 9,226,257 B2
(45) Date of Patent: Dec. 29, 2015

(54) POSITIONING FOR WLANS AND OTHER WIRELESS NETWORKS

(75) Inventors: Stephen W. Edge, Escondido, CA (US); Andreas K. Wachter, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 792 days.

(21) Appl. No.: 11/982,843

(22) Filed: Nov. 4, 2007

(65) Prior Publication Data

US 2008/0123608 A1    May 29, 2008

Related U.S. Application Data

(60) Provisional application No. 60/856,684, filed on Nov. 4, 2006, provisional application No. 60/858,320, filed on Nov. 10, 2006.

(51) Int. Cl.
*H04W 64/00* (2009.01)
*H04W 4/02* (2009.01)
(Continued)

(52) U.S. Cl.
CPC .............. *H04W 64/00* (2013.01); *H04L 67/18* (2013.01); *H04W 4/02* (2013.01); *H04W 84/12* (2013.01)

(58) Field of Classification Search
CPC ......... H04W 8/06; H04W 8/02; H04W 64/00; H04W 4/02; H04W 84/12; H04L 67/18
USPC ............... 370/328, 331, 332, 338; 455/456.1, 455/456.2, 456.3, 456.4, 456.5, 456.6
See application file for complete search history.

(56) References Cited

U.S. PATENT DOCUMENTS

| 5,276,905 A | 1/1994 | Hurst et al. |
| 5,276,906 A | 1/1994 | Felix |

(Continued)

FOREIGN PATENT DOCUMENTS

| CA | 2296812 A1 | 8/2000 |
| CN | 1334688 A | 2/2002 |

(Continued)

OTHER PUBLICATIONS

3GPP TS 25.305 V7.3.0, (Jun. 2006), 3rd Generation Partnership Project; Technical Specification Group Radio Access Network, "Stage 2 functional specification of User Equipment (UE) positioning in UTRAN (Release 7)," pp. 1-79.

(Continued)

*Primary Examiner* — Christopher Grey
(74) *Attorney, Agent, or Firm* — M. Munes Tomeh

(57) ABSTRACT

Techniques to support positioning for access points and terminals in WLANs and other wireless networks are described. In one aspect, WLAN positioning is supported with Secure User Plane Location (SUPL). A terminal obtains measurements for an access point in a WLAN and/or receives measurements made by the access point for the terminal. The terminal determines WLAN AP information for the access point and/or the terminal based on the measurements and sends the WLAN AP information to a SUPL Location Platform (SLP). The SLP determines a location estimate for the terminal based on the WLAN AP information. In another aspect, the terminal receives supported network information from the SLP. The terminal obtains network measurement information (e.g., measurements) for a radio access network and determines which particular network measurement information to send based on the supported network information. The terminal sends network measurement information permitted by the supported network information to the SLP.

24 Claims, 13 Drawing Sheets

(51) Int. Cl.
*H04L 29/08* (2006.01)
*H04W 84/12* (2009.01)

(56) References Cited

U.S. PATENT DOCUMENTS

| | | | |
|---|---|---|---|
| 5,327,144 A | 7/1994 | Stilp et al. | |
| 5,512,908 A | 4/1996 | Herrick | |
| 5,708,975 A | 1/1998 | Heiskari et al. | |
| 5,717,406 A | 2/1998 | Sanderford et al. | |
| 5,805,581 A | 9/1998 | Uchida et al. | |
| 5,812,087 A | 9/1998 | Krasner | |
| 5,841,396 A | 11/1998 | Krasner | |
| 5,874,914 A | 2/1999 | Krasner | |
| 5,945,944 A | 8/1999 | Krasner | |
| 5,999,124 A | 12/1999 | Sheynblat | |
| 6,055,434 A | 4/2000 | Seraj | |
| 6,061,018 A | 5/2000 | Sheynblat | |
| 6,091,362 A | 7/2000 | Stilp et al. | |
| 6,108,558 A | 8/2000 | Vanderspool, II | |
| 6,111,538 A | 8/2000 | Schuchman et al. | |
| 6,128,492 A | 10/2000 | Chung | |
| 6,147,644 A | 11/2000 | Castles et al. | |
| 6,185,427 B1 | 2/2001 | Krasner et al. | |
| 6,208,290 B1 | 3/2001 | Krasner | |
| 6,215,442 B1 | 4/2001 | Sheynblat et al. | |
| 6,230,018 B1 | 5/2001 | Watters et al. | |
| 6,236,365 B1 | 5/2001 | LeBlanc et al. | |
| 6,236,635 B1 | 5/2001 | Miyamoto et al. | |
| 6,249,252 B1 | 6/2001 | Dupray | |
| 6,271,788 B1 | 8/2001 | Longaker et al. | |
| 6,275,707 B1 | 8/2001 | Reed et al. | |
| 6,353,412 B1 | 3/2002 | Soliman | |
| 6,389,291 B1 | 5/2002 | Pande et al. | |
| 6,414,635 B1 | 7/2002 | Stewart et al. | |
| 6,420,999 B1 | 7/2002 | Vayanos | |
| 6,430,415 B1 | 8/2002 | Agashe et al. | |
| 6,445,927 B1 | 9/2002 | King et al. | |
| 6,466,938 B1 | 10/2002 | Goldberg | |
| 6,593,863 B2 | 7/2003 | Pitio | |
| 6,597,916 B2 | 7/2003 | Edge | |
| 6,650,288 B1 | 11/2003 | Pitt et al. | |
| 6,677,894 B2 | 1/2004 | Sheynblat et al. | |
| 6,677,895 B1 | 1/2004 | Holt | |
| 6,704,574 B2 | 3/2004 | Lin | |
| 6,754,488 B1 | 6/2004 | Won et al. | |
| 6,757,545 B2 | 6/2004 | Nowak et al. | |
| 6,799,047 B1 | 9/2004 | Bahl et al. | |
| 6,801,778 B2 | 10/2004 | Koorapaty et al. | |
| 6,865,395 B2 | 3/2005 | Riley | |
| 6,888,811 B2 | 5/2005 | Eaton | |
| 6,937,867 B2 | 8/2005 | Oda et al. | |
| 6,941,145 B2 | 9/2005 | Ogino et al. | |
| 6,956,527 B2 | 10/2005 | Rogers et al. | |
| 6,973,320 B2 | 12/2005 | Brown et al. | |
| 6,990,428 B1 | 1/2006 | Kaiser et al. | |
| 7,006,838 B2 | 2/2006 | Diener et al. | |
| 7,039,418 B2 | 5/2006 | Amerga et al. | |
| 7,047,022 B2 | 5/2006 | Aoyama | |
| 7,054,627 B1 | 5/2006 | Hillman | |
| 7,057,557 B2 | 6/2006 | Lee | |
| 7,068,999 B2 | 6/2006 | Ballai | |
| 7,069,024 B2 | 6/2006 | Sharony | |
| 7,082,311 B2 | 7/2006 | Hefner et al. | |
| 7,127,257 B2 | 10/2006 | Riley et al. | |
| 7,139,580 B2 | 11/2006 | Stein et al. | |
| 7,142,848 B2 | 11/2006 | Owen et al. | |
| 7,149,531 B2 | 12/2006 | Misikangas | |
| 7,158,798 B2 | 1/2007 | Lee et al. | |
| 7,203,503 B2 | 4/2007 | Cedervall et al. | |
| 7,206,585 B2 | 4/2007 | Gilham et al. | |
| 7,215,281 B2 | 5/2007 | Tekinay et al. | |
| 7,224,982 B2 | 5/2007 | Ormson | |
| 7,224,983 B2 | 5/2007 | Budka et al. | |
| 7,248,858 B2 | 7/2007 | Barber et al. | |
| 7,251,493 B2 | 7/2007 | Camp, Jr. et al. | |
| 7,257,411 B2 | 8/2007 | Gwon et al. | |
| 7,257,413 B2 | 8/2007 | Sheynblat | |
| 7,280,505 B2 | 10/2007 | Chaskar et al. | |
| 7,295,808 B2 | 11/2007 | Soliman | |
| 7,319,878 B2 | 1/2008 | Sheynblat et al. | |
| 7,369,859 B2 | 5/2008 | Gallagher | |
| 7,522,588 B2 | 4/2009 | Biacs et al. | |
| 7,613,155 B2 * | 11/2009 | Shim | 370/338 |
| 7,706,813 B2 * | 4/2010 | Shim | 455/456.3 |
| 7,778,639 B2 * | 8/2010 | Shim | 455/433 |
| 7,873,375 B2 * | 1/2011 | Annunziato et al. | 455/456.6 |
| 8,068,056 B2 * | 11/2011 | Wachter et al. | 342/451 |
| 2002/0080759 A1 | 6/2002 | Harrington et al. | |
| 2002/0116368 A1 | 8/2002 | Matsumoto | |
| 2002/0137526 A1 | 9/2002 | Shinohara | |
| 2002/0168989 A1 | 11/2002 | Dooley et al. | |
| 2002/0199196 A1 | 12/2002 | Rabinowitz et al. | |
| 2003/0006931 A1 | 1/2003 | Mages | |
| 2003/0008663 A1 | 1/2003 | Stein et al. | |
| 2003/0008664 A1 | 1/2003 | Stein et al. | |
| 2003/0022675 A1 | 1/2003 | Mergler | |
| 2003/0026225 A1 | 2/2003 | Ogino et al. | |
| 2003/0040323 A1 | 2/2003 | Pihl et al. | |
| 2003/0096622 A1 | 5/2003 | Moilanen | |
| 2003/0125044 A1 | 7/2003 | Deloach et al. | |
| 2003/0144006 A1 | 7/2003 | Johansson et al. | |
| 2003/0157943 A1 | 8/2003 | Sabat, Jr. | |
| 2003/0176196 A1 | 9/2003 | Hall et al. | |
| 2003/0210142 A1 | 11/2003 | Freathy et al. | |
| 2003/0220105 A1 | 11/2003 | Daigremont et al. | |
| 2003/0235172 A1 | 12/2003 | Wood | |
| 2004/0002346 A1 | 1/2004 | Santhoff | |
| 2004/0043765 A1 | 3/2004 | Tolhurst | |
| 2004/0127229 A1 | 7/2004 | Ishii | |
| 2004/0162090 A1 | 8/2004 | Suryanarayana et al. | |
| 2004/0203567 A1 | 10/2004 | Berger | |
| 2004/0203926 A1 | 10/2004 | Ruutu et al. | |
| 2004/0258012 A1 | 12/2004 | Ishii | |
| 2004/0259546 A1 | 12/2004 | Balachandran et al. | |
| 2005/0014497 A1 | 1/2005 | Goren | |
| 2005/0020309 A1 | 1/2005 | Moeglein et al. | |
| 2005/0037775 A1 | 2/2005 | Moeglein et al. | |
| 2005/0043038 A1 | 2/2005 | Maanoja et al. | |
| 2005/0062643 A1 | 3/2005 | Pande et al. | |
| 2005/0064877 A1 | 3/2005 | Gum et al. | |
| 2005/0090266 A1 | 4/2005 | Sheynblat | |
| 2005/0124355 A1 | 6/2005 | Cromer et al. | |
| 2005/0125493 A1 | 6/2005 | Chaskar et al. | |
| 2005/0153687 A1 | 7/2005 | Niemenmaa et al. | |
| 2005/0197137 A1 | 9/2005 | Radic et al. | |
| 2005/0227689 A1 | 10/2005 | Jewett | |
| 2005/0227705 A1 | 10/2005 | Rousu et al. | |
| 2005/0227707 A1 | 10/2005 | Law et al. | |
| 2005/0232189 A1 * | 10/2005 | Loushine | 370/328 |
| 2005/0246334 A1 | 11/2005 | Tao et al. | |
| 2005/0250516 A1 * | 11/2005 | Shim | 455/456.1 |
| 2006/0245406 A1 * | 11/2006 | Shim | 370/338 |
| 2007/0001867 A1 | 1/2007 | Rowe et al. | |
| 2007/0002813 A1 | 1/2007 | Tenny et al. | |
| 2007/0037586 A1 * | 2/2007 | Kim et al. | 455/456.1 |
| 2007/0121560 A1 * | 5/2007 | Edge | 370/338 |
| 2007/0140163 A1 * | 6/2007 | Meier et al. | 370/329 |
| 2007/0270168 A1 | 11/2007 | Sheynblat | |
| 2008/0280624 A1 | 11/2008 | Wrappe | |
| 2009/0104904 A1 * | 4/2009 | Shim | 455/433 |
| 2009/0143076 A1 | 6/2009 | Wachter et al. | 455/456.1 |
| 2010/0062752 A1 * | 3/2010 | Shim | 455/418 |
| 2012/0115508 A1 | 5/2012 | Moeglein et al. | |
| 2013/0095850 A1 | 4/2013 | Sheynblat | |
| 2015/0018009 A1 | 1/2015 | Moeglein et al. | |
| 2015/0057018 A1 | 2/2015 | Moeglein et al. | |

FOREIGN PATENT DOCUMENTS

| | | |
|---|---|---|
| CN | 1373371 A | 10/2002 |
| CN | 1413058 | 4/2003 |
| DE | 10142954 A1 | 4/2003 |
| EP | 0933961 A2 | 8/1999 |
| EP | 1215928 A2 | 6/2002 |

(56) References Cited

FOREIGN PATENT DOCUMENTS

| | | |
|---|---|---|
| EP | 1289320 A1 | 3/2003 |
| EP | 1387590 A2 | 2/2004 |
| JP | 6148308 A | 5/1994 |
| JP | 10213644 | 8/1998 |
| JP | 2000156881 | 6/2000 |
| JP | 2001500256 | 1/2001 |
| JP | 2001305210 | 10/2001 |
| JP | 2001333184 | 11/2001 |
| JP | 2002077965 | 3/2002 |
| JP | 2002510893 | 4/2002 |
| JP | 2002195846 A | 7/2002 |
| JP | 2002236163 A | 8/2002 |
| JP | 2002246976 A | 8/2002 |
| JP | 2003014488 A | 1/2003 |
| JP | 2003023384 A | 1/2003 |
| JP | 2003047045 | 2/2003 |
| JP | 2003152633 | 5/2003 |
| JP | 2003520532 A | 7/2003 |
| JP | 2003319443 | 11/2003 |
| JP | 2004040775 | 2/2004 |
| JP | 2004086349 A | 3/2004 |
| JP | 2004129026 A | 4/2004 |
| JP | 2005195429 | 7/2005 |
| JP | 2005525003 A | 8/2005 |
| JP | 2005525016 | 8/2005 |
| JP | 2005536944 A | 12/2005 |
| JP | 2006504284 A | 2/2006 |
| JP | 2007518979 T | 7/2007 |
| JP | 2007520915 A | 7/2007 |
| JP | 2007525093 | 8/2007 |
| JP | 2007525094 T | 8/2007 |
| JP | 2011019226 | 1/2011 |
| KR | 19980702271 | 7/1998 |
| KR | 19990047966 | 7/1999 |
| KR | 20000022270 A | 4/2000 |
| KR | 20010071208 | 7/2001 |
| KR | 20010087969 A | 9/2001 |
| KR | 20020073167 | 9/2002 |
| KR | 20030011866 | 2/2003 |
| KR | 20030052838 A | 6/2003 |
| KR | 20030079972 | 10/2003 |
| KR | 20050098901 | 10/2005 |
| RU | 2001531 C1 | 10/1993 |
| RU | 2163053 C2 | 2/2001 |
| WO | WO9307684 A1 | 4/1993 |
| WO | WO9810306 A1 | 3/1998 |
| WO | WO99057576 | 11/1999 |
| WO | WO0027143 A1 | 5/2000 |
| WO | WO-0133302 A2 | 5/2001 |
| WO | WO-0154422 A2 | 7/2001 |
| WO | WO0221873 A1 | 3/2002 |
| WO | WO-0223215 A1 | 3/2002 |
| WO | WO-0246788 A2 | 6/2002 |
| WO | WO-02071781 A1 | 9/2002 |
| WO | WO02079797 A1 | 10/2002 |
| WO | WO03010552 A2 | 2/2003 |
| WO | WO-03021286 A2 | 3/2003 |
| WO | WO03021851 A2 | 3/2003 |
| WO | WO03038466 | 5/2003 |
| WO | WO03058985 | 7/2003 |
| WO | WO03058986 A2 | 7/2003 |
| WO | WO-03065740 A2 | 8/2003 |
| WO | 03094564 A1 | 11/2003 |
| WO | WO03094285 A2 | 11/2003 |
| WO | WO2004017092 A1 | 2/2004 |
| WO | WO2004/019559 | 3/2004 |
| WO | WO2004032561 | 4/2004 |
| WO | WO2004045110 | 5/2004 |
| WO | WO2004106964 | 12/2004 |
| WO | 2005004528 A1 | 1/2005 |
| WO | WO2005004527 | 1/2005 |
| WO | WO2005004528 | 1/2005 |
| WO | WO2005/029120 | 3/2005 |
| WO | WO2005027393 | 3/2005 |
| WO | WO-2005046254 A2 | 5/2005 |
| WO | WO-2005065320 A2 | 7/2005 |
| WO | WO2005089384 | 9/2005 |
| WO | WO2006029277 A1 | 3/2006 |

OTHER PUBLICATIONS

3GPP2 C.S0022-0-1, Publication Version, Date: Feb. 16, 2001, 3rd Generation Partnership Project 2 (3GPP2), Position Determination Service Standard for Dual Mode Spread Spectrum Systems, Addendum (TIA/EIA/IS-801-1).
3rd Generation Partnership Project 2 "3GPP2", Internet Article, Version 1.0 (Online), Oct. 2005, Section 4 (6 pages).
3rd Generation Partnership Project 2 "3GPP2": "cdma2000 Packet Data Services; Wireless Local Area Network (WLAN) Inter-working," 3GPP2 X.50028-000-0, Version 1.0, pp. 1-119 (Jul. 2006).
3rd Generation Partnership Project 2 "3GPP2": "TIA/EIA-41-D Location Services Enhancements," 3GPP2 X.50002, Version 1.0.0, pp. 1-234 (Mar. 2004).
3rd Generation Partnership Project; Technical Specificatiln Group GSM/EDGE Radio Access Network, "Generic access to A/Gb interface; Stage 2 (Release 6)," 3GPP TS 43.318 V6.8.0, pp. 1-71 (Nov. 2006).
3rd Generation Partnership Project; Technical Specification Group GSM/EDGE Radio Access Network, "Functional stage 2 description of Location Services (LCS) in Geran (Release 4)," 3GPP TS 43.059 V4.7.0, pp. 1-50 (Apr. 2006).
3rd Generation Partnership Project; Technical Specification Group Services and System Aspects, "3GPP system to Wireless Local Area Network (WLAN) interworking; System description (Release 6)," 3GPP TS 23.234 V6.10.0, pp. 1-75 (Sep. 2006).
3rd Generation Partnership Project; Technical Specification Group Services and System Aspects, "Functional stage 2 description of Location Services (LCS)(Release 7)," 3GPP TS 23.271 V7.6.0, pp. 1-141 (Sep. 2006).
Anonymous: "Position Determination Service for cdma2000(R) Spread Spectrum Systems;(Revision of TIA/EIA/IS-801) ;TIA-801-A" 19000101, Apr. 2004, XP017004816 p. 2.5-p. 2.6.
International Search Report, PCT/US2006/060632—International Search Authority—European Patent Office, Jul. 9, 2007.
Joint Standard, "Enhanced Wireless 9-1-1 Phase II (Erratum)," J-STD-036-B, pp. 1-344 (Jun. 2006).
Open Mobile Alliance, "Secure User Plane Location Architecture," Candidate Version 1.0, pp. 1-80 (Sep. 2006).
Translation of Office Action in Korean application 10-2005-7024968 corresponding to U.S. Appl. No. 10/877,205, citing US6236365 and KR20010071208 dated Jan. 17, 2011.
Translation of Office Action in Korean application 2010-7013139 corresponding to U.S. Appl. No. 11/557,451, citing KR20050098901 and US20050153687 dated Feb. 24, 2011.
Universal Mobile Telecommunications System (UMTS); Radio Resource Control (RRC); Protocol specification (3GPP TS 25.331 version 5.18.0 Release 5) ETSI TS 125 331 V5.18.0, pp. 1-1047 (Sep. 2006).
Written Opinion, PCT/US2006/060632—International Search Authority—European Patent Office, Jul. 9, 2007.
Orville, "Development of the National Lightning Detection Network," BAMS, Feb. 2008, 11 pages.
Partial European Search Report—EP10187475—Search Authority—Munich—May 25, 2012.
European Search Report—EP10187475—Search Authority—Munich—Nov. 30, 2012.
Kikuchi T, "What's New, Not Worse Than Wired, Nikkei Electronics," Japan, Nikkei Business Publications, Inc., Mar. 31, 2003, No. 844, pp. 30-31.
Suzuki Y, "Technologies of Internet Access Communication," Information Processing, Japan, The Information Processing Society of Japan, Apr. 2002, vol. 43, No. 4, pp. 462-467.
European Search Report—EP14200157—Search Authority—Munich—Apr. 9, 2015.

* cited by examiner

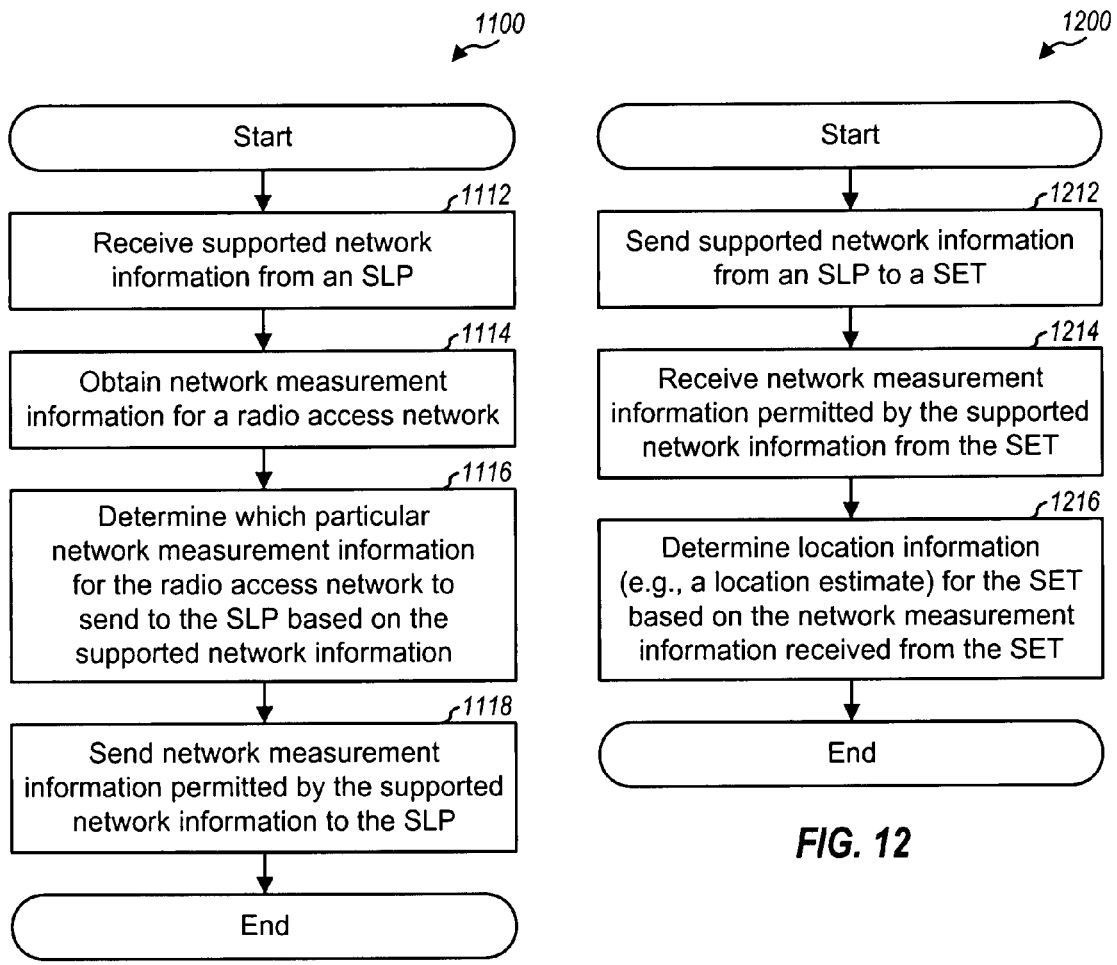

POSITIONING FOR WLANS AND OTHER WIRELESS NETWORKS

The present application claims priority to provisional U.S. Application Ser. No. 60/856,684, entitled "Support for WLAN Positioning in SUPL," filed Nov. 4, 2006, and provisional U.S Application Ser. No. 60/858,320, entitled "Support for WLAN Positioning in SUPL," filed Nov. 10, 2006, both assigned to the assignee hereof and incorporated herein by reference.

BACKGROUND

I. Field

The present disclosure relates generally to communication, and more specifically to techniques for performing positioning.

II. Background

Wireless communication networks are widely deployed to provide various communication services such as voice, video, packet data, messaging, broadcast, etc. These wireless networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, and Orthogonal FDMA (OFDMA) networks.

It is often desirable, and sometimes necessary, to know the location of a terminal in a wireless network. The terms "location" and "position" are synonymous and are used interchangeably herein. For example, a user may utilize the terminal to browse through a website and may click on location sensitive content. The location of the terminal may then be determined and used to provide appropriate content to the user. There are many other scenarios in which knowledge of the location of the terminal is useful or necessary.

Some wireless networks such as CDMA networks can readily support positioning. These wireless networks may have many base stations that transmit signals encoded with timing information. The location of a terminal may be determined based on timing measurements for a sufficient number of base stations and known fixed locations of these base stations. In some wireless networks, the locations of the transmitters may not be known or there may be uncertainty in the transmitter locations. Nevertheless, it may be desirable to determine the location of a terminal in such a wireless network.

SUMMARY

Techniques to support positioning for access points and terminals in wireless local area networks (WLANs) as well as other wireless networks are described herein. Positioning refers to a process to measure/compute a geographic location estimate of a target device. WLAN positioning refers to positioning based on measurements and/or other information for one or more stations in a WLAN. A station may be a terminal or an access point. A location estimate may also be referred to as a position estimate, a position fix, etc.

In one aspect, WLAN positioning is supported with Secure User Plane Location (SUPL) from Open Mobile Alliance (OMA). A terminal, which may be referred to as a SUPL Enabled Terminal (SET), may obtain measurements for signal strength, signal-to-noise ratio (S/N), round trip delay (RTD), and/or some other quantity for an access point in a WLAN. Alternatively or additionally, the terminal may receive measurements for signal strength, S/N, and/or some other quantity, which may be made by the access point for the terminal. The terminal may determine WLAN AP information for the access point and/or the terminal based on the measurements and may send the WLAN AP information to a SUPL Location Platform (SLP), which is a location server in SUPL. The SLP may determine location information (e.g., a location estimate) for the terminal based on the WLAN AP information and may send the location information to a requesting entity.

In another aspect, positioning in SUPL is supported using supported network information. A terminal may receive supported network information from an SLP. The supported network information may inform the terminal of which type(s) of network measurement information are supported by the SLP. The terminal may obtain network measurement information (e.g., measurements for signal strength, S/N, RTD, etc.) for a radio access network (e.g., WLAN, GSM, CDMA, WCDMA, etc.). The terminal may determine which particular network measurement information to send to the SLP based on the supported network information. The terminal may then send network measurement information permitted by the supported network information to the SLP. The SLP may determine location information (e.g., a location estimate) for the terminal based on the network measurement information received from the terminal.

Various aspects and features of the disclosure are described in further detail below.

BRIEF DESCRIPTION OF THE DRAWINGS

FIG. 11 shows a process performed by a terminal for positioning in SUPL.

FIG. 12 shows a process performed by an SLP to support positioning in SUPL.

DETAILED DESCRIPTION

Techniques for supporting positioning in wireless networks are described herein. The techniques may be used for various wireless networks such as WLANs, wireless wide area networks (WWANs), metropolitan area networks (WMANs), broadcast networks, etc. The terms "network" and "system" are often used interchangeably. A WWAN is a wireless network that provides communication coverage for a large geographic area such as, e.g., a city, a state, or an entire country. A WWAN may be a cellular network such as a CDMA network, a TDMA network, an FDMA network, an OFDMA network, etc. A CDMA network may implement a radio technology such as Wideband CDMA (WCDMA), cdma2000, etc. cdma2000 covers IS-2000, IS-95, and IS-856 standards and is commonly referred to as "CDMA". A TDMA network may implement a radio technology such as Global System for Mobile Communications (GSM), Digital Advanced Mobile Phone System (D-AMPS), etc. D-AMPS covers IS-248 and IS-54. These various radio technologies and standards are known in the art. WCDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

A WLAN is a wireless network that provides communication coverage for a small or medium geographic area such as, e.g., a building, a mall, a coffee shop, an airport terminal, a school, hospital etc. A WLAN may implement a radio technology such as any defined by IEEE 802.11, Hiperlan, etc. A WMAN may implement a radio technology such as any defined by IEEE 802.16. IEEE 802.11 and IEEE 802.16 are two families of standards from The Institute of Electrical and Electronics Engineers (IEEE). The IEEE 802.11 family includes 802.11a, 802.11b, 802.11g and 802.11n standards and is commonly referred to as Wi-Fi. Each IEEE 802.11 standard specifies operation in a specific frequency band (e.g., 2.4 GHz or 5 GHz) using one or more modulation techniques. The IEEE 802.16 family includes 802.16e standard and is commonly referred to as WiMAX. Hiperlan is a WLAN technology that is commonly used in Europe. For clarity, much of the following description is for a WLAN.

Figure 1:
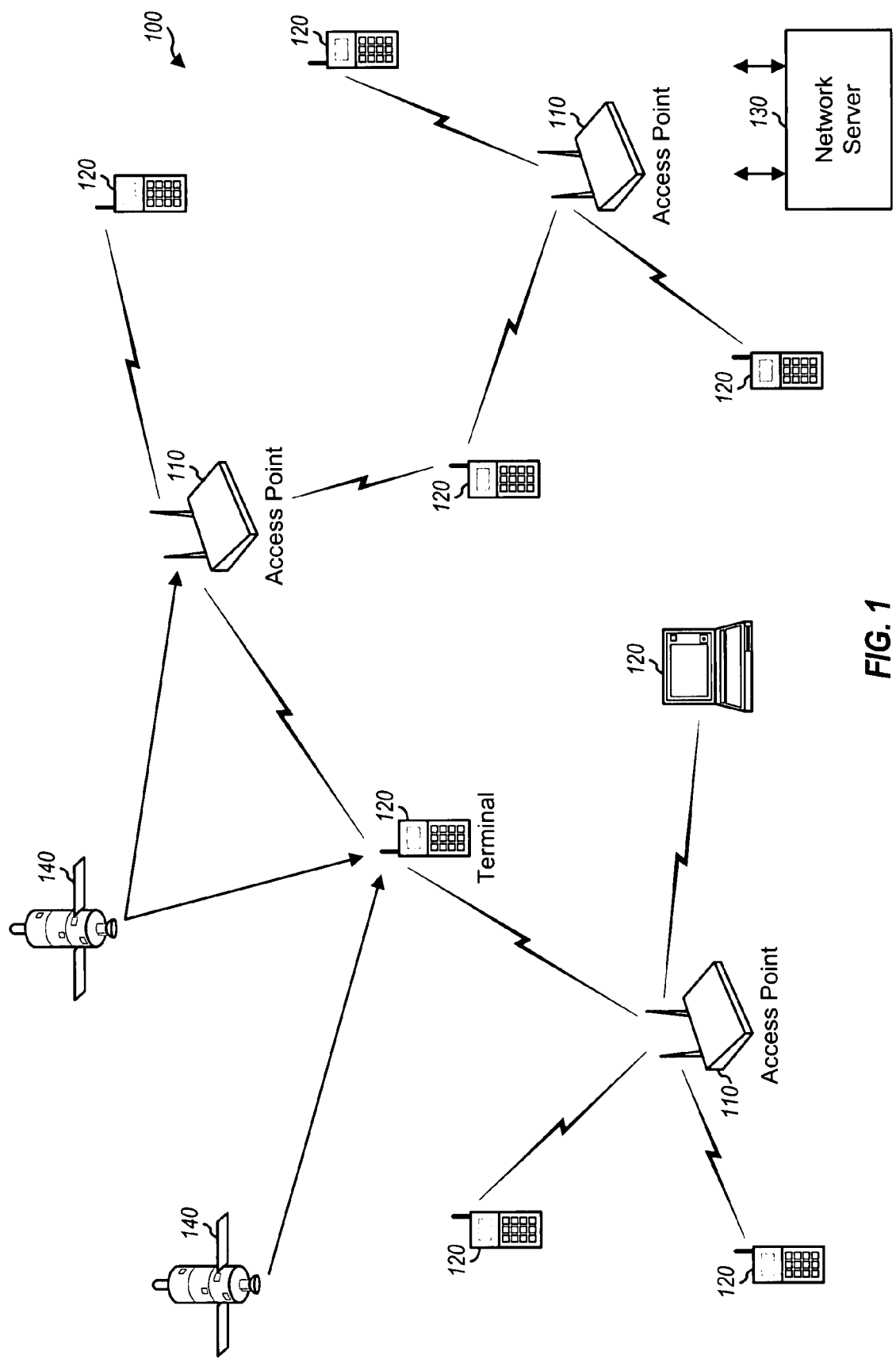
FIG. 1 shows a WLAN that supports positioning.

FIG. 1 shows a WLAN 100 that supports positioning. WLAN 100 includes access points (AP) 110 that communicate with terminals 120. An access point is a station that supports communication for terminals associated with that access point. An access point may also be referred to as a base station. For WMAN and WWAN wireless technologies, an access point may be replaced by a Node B, an evolved Node B (eNode B), a base transceiver subsystem, etc. Access points 110 may directly or indirectly couple to a network server 130 that may perform various functions for positioning. Network server 130 may be a single network entity or a collection of network entities. In general, a WLAN may include any number of access points. Each access point may be identified by an access point identity (AP ID), which may be a globally unique Medium Access Control (MAC) address that is included in frames transmitted by the access point, an Internet Protocol (IP) address, etc.

A terminal is a station that can communicate with another station via a wireless medium. A terminal may be stationary or mobile and may also be referred to as a mobile station, a user equipment, a subscriber station, etc. A terminal may be a cellular phone, a personal digital assistant (PDA), a handheld device, a wireless device, a laptop computer, a wireless modem, a cordless phone, a telemetry device, a tracking device, etc.

An access point or a terminal may also receive signals from satellites 140, which may be part of the United States Global Positioning System (GPS), the European Galileo system, the Russian Glonass system, or some other satellite positioning system (SPS). A terminal may measure signals from access points 110 and/or signals from satellites 140. The measurements may be used to determine the location of the terminal and/or access points, as described below.

In general, a WLAN and/or its associated terminals may support any number of positioning methods and any positioning method. Table 1 lists some positioning methods that may be supported by a WLAN and/or its associated terminals and provides a short description for each method.

TABLE 1

| Positioning Method | Description |
|---|---|
| AP ID | Solution based on identities of access points. |
| RTD | Solution based on round trip delay (RTD) measurements. |
| OTD | Solution based on observed time difference (OTD) measurements. |
| TOA | Solution based on time of arrival (TOA) measurements. |
| Signal strength/quality | Solution based on signal strength and/or signal quality measurements. |
| Cell ID for A-GPS | Solution based on cell ID and used for assisted GPS (A-GPS). |

In the following description, the term "GPS" generically refers to positioning based on any satellite positioning system, e.g., GPS, Galileo, etc. The term "A-GPS" generically refers to positioning based on any satellite positioning system with GPS assistance data.

The positioning methods may be used to (a) determine the locations of terminals based on known locations of access points and/or (b) determine the locations of access points based on known locations of terminals. The known locations may be obtained independently with GPS, A-GPS, etc. The ability to determine access point locations based on terminal locations may be highly desirable since numerous WLANs are currently deployed, WLANs are not always publicly known, and access points may be moved (i.e., are not always fixed). The locations of access points may be determined and/or updated based on terminals supporting independent positioning methods such as GPS, A-GPS, etc. The access point locations may be used to determine the locations of terminals that do not support independent positioning methods such as GPS, A-GPS, etc.

The various positioning methods may be supported by the terminals and/or by employing a network server, e.g., network server 130 in FIG. 1 or any one of access points 110. The network server may instruct the terminals to provide measurements and may compute location estimates for the terminals and/or access points. The network server may also store location information for the terminals and/or access points and may use the location information to support positioning.

The AP ID method utilizes known locations of access points in a WLAN to determine the locations of terminals. A location may be given by 2-dimensional (x, y) or 3-dimensional (x, y, z) geographic coordinates. The locations of the access points may be determined in various manners. In one scheme, the location of an access point may be determined by a WLAN operator by surveying, using map association, etc. In another scheme, the location of an access point may be determined based on a positioning method such as GPS, A-GPS, etc.

Figure 2A:
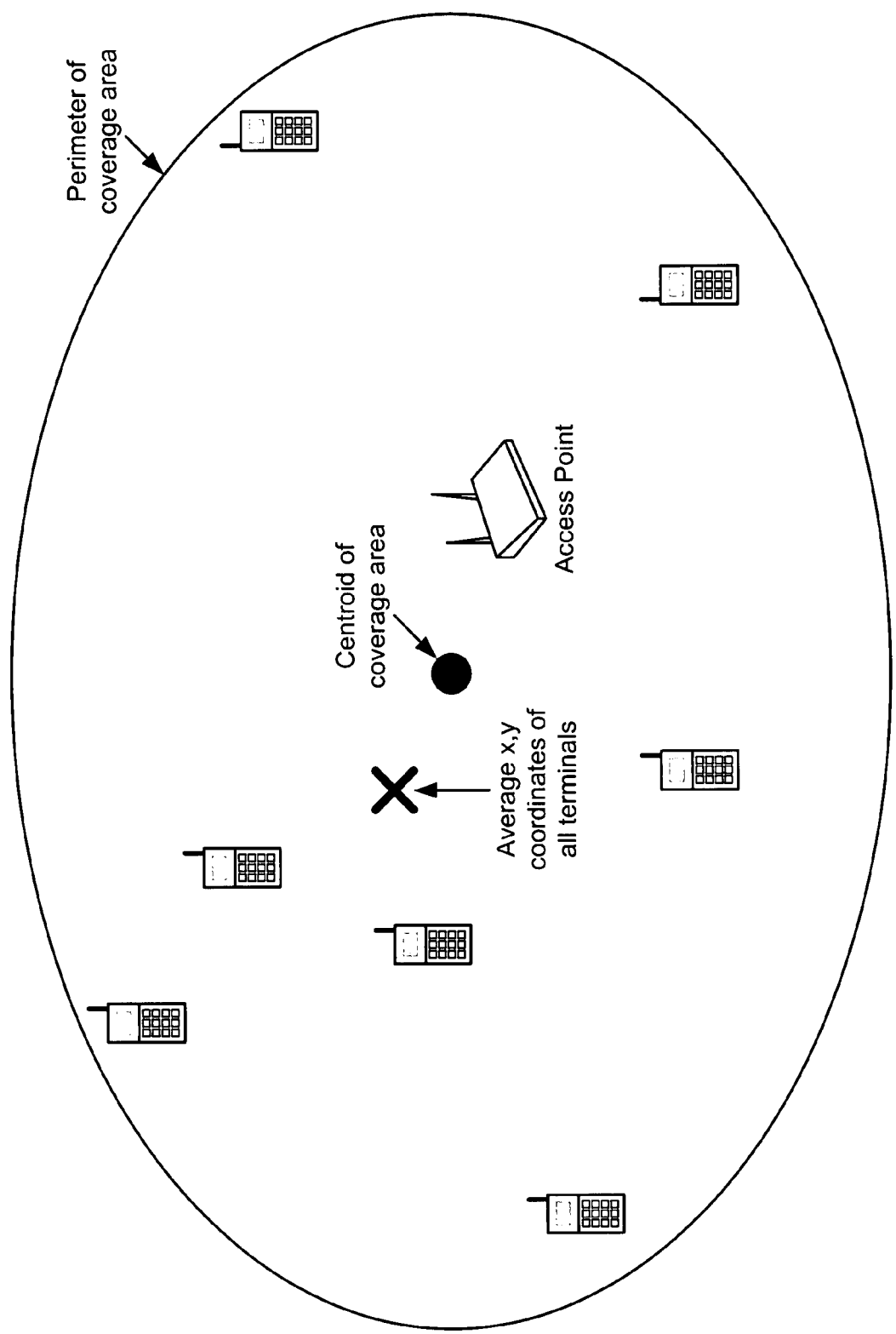
FIGS. 2A and 2B show positioning of an access point.

FIG. 2A shows a scheme for positioning an access point based on known locations of one or more terminals communicating with the access point. A coverage area for the access point may be determined based on the known locations of different terminals and/or different known locations of the same terminals. The location of the access point may be determined based on all known terminal locations, e.g., an average latitude (x) coordinate and an average longitude (y)

coordinate for the terminal locations. To avoid bias due to greater density of terminals in one area than other areas, the perimeter of the coverage area may be determined based on the outermost terminal locations. The location of the access point may then be given by a point within the area enclosed by the perimeter, e.g., the centroid of the enclosed area.

Figure 2B:
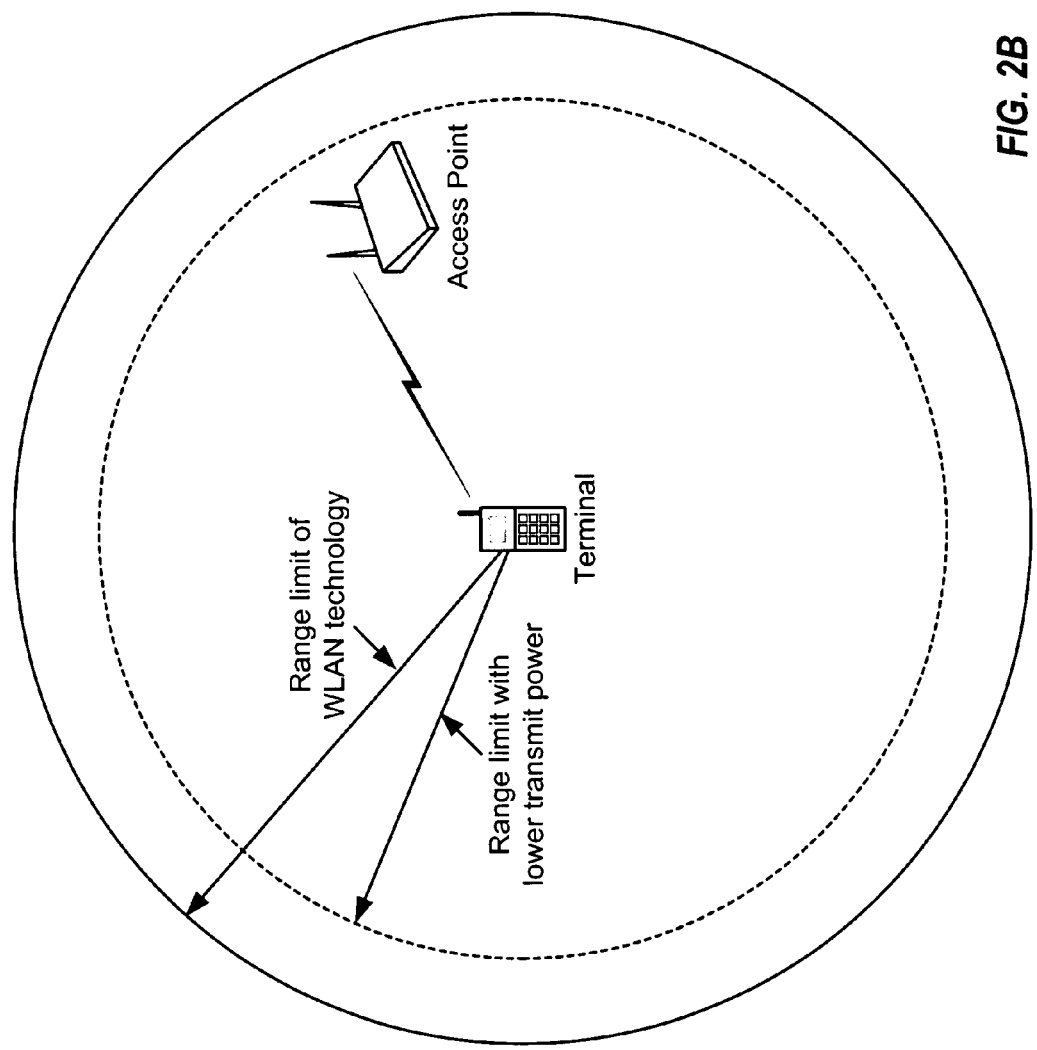

FIG. 2B shows a scheme for positioning an access point based on known location of a single terminal. The location of the terminal may be provided as an approximate location of the access point. This approximate location has an error or uncertainty that is dependent on the coverage range of the access point. If the WLAN technology is known (e.g., 802.11b, 802.11g, etc.), then the maximum distance from the terminal to the access point may be estimated based on the range limitation of the WLAN technology. For example, many 802.11 technologies generally have range limits of around 50 to 100 meters. The location of the access point may then be approximated by the terminal location with the actual access point location lying within a circle centered at the terminal location and having a radius given by the range limit. The range limit is typically given for the maximum transmit power allowed by the WLAN technology. Hence, a smaller radius (and thus less uncertainty) may be used for the circle if it is known that the access point or the terminal used less than the maximum transmit power for communication.

In general, the location of an access point may be determined in advance (e.g., through cartography or surveying) or in the field by applying any of the positioning methods in reverse. In particular, the access point location may be determined based on one or more known locations of one or more terminals supporting reliable and accurate positioning methods such as GPS, A-GPS, etc.

The AP ID method can provide a location estimate for a terminal based on an identity of an access point serving or received by the terminal and the known location of the access point. The location of the access point may be provided as the location estimate for the terminal. This location estimate has an uncertainty determined by the coverage range of the access point, which may be estimated based on the WLAN technology as described above. The accuracy of the location estimate may then be dependent on the range limit of the WLAN technology. The location estimate may be fairly accurate for WLAN technologies with limited coverage (e.g., up to 50 meters for some IEEE 802.11 technologies) and less accurate for WLAN, WMAN and WWAN technologies with extended range or where repeaters are used to extend coverage.

The location of an access point may be made available to terminals within the coverage area and/or in other networks. For example, in an IEEE 802.11 WLAN, the access point may include its location in a beacon that is broadcast periodically to the terminals. In this case, terminals that can receive the beacon may be able to estimate their locations based on the access point location obtained from the beacon.

The RTD method provides a location estimate for a station based on RTD measurements for one or more other stations and known locations of the other stations. For example, a terminal may measure the RTD of radio signal propagation between the terminal and one or more access points. The location of the terminal may then be determined based on the RTD measurements and known locations of the access points using triangulation techniques.

RTD measurements may be made in various manners. For example, in IEEE 802.11v, a terminal may send a message (e.g., a Presence Request frame) to an access point and may receive an acknowledgment (e.g., a Presence Response frame) from the access point. The acknowledgment may contain the time delay measured by the access point between the receive time of the last part (e.g., the final bit or chip) of the terminal's message and the transmit time of the first part (e.g., the first bit or chip) of the acknowledgment. The terminal may measure the time delay between the transmit time of the last part of the message and the receive time of the first part of the acknowledgment. The terminal may then subtract the time delay reported by the access point from the time delay measured by the terminal to obtain a measurement of RTD. Other schemes may also be used to measure the time difference between sending a given message and receiving a response.

The OTD method provides a location estimate for a station based on OTD measurements for other stations and known locations of the other stations. For example, a terminal may measure the observed transmission timing difference between pairs of access points. These measurements may be based on transmissions containing implicit or explicit timing information from the access points. These transmissions may correspond to beacon frames broadcast periodically by access points in IEEE 802.11 WLAN. The location of the terminal may then be obtained based on these measurements using trilateration.

Figure 3:
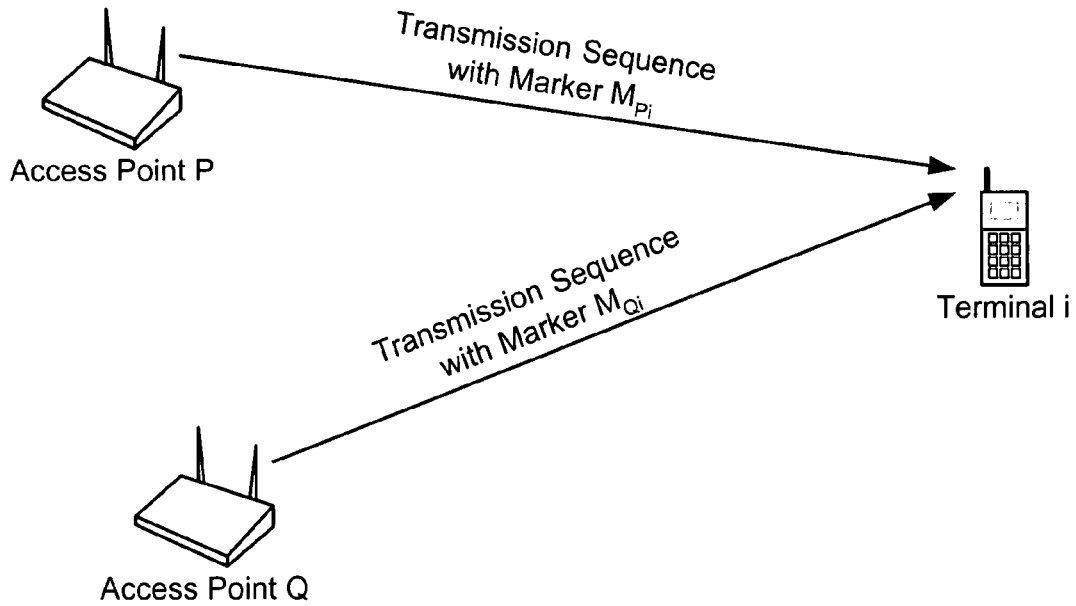
FIG. 3 shows OTD measurement by a terminal for two access points.

FIG. 3 shows OTD measurement by a terminal i for two access points P and Q. Each access point transmits a series of transmission sequences, e.g., sequences of binary encoded data. Each transmission sequence contains implicit or explicit relative time reference. Access points P and Q may transmit their transmission sequences periodically. For example, each transmission sequence may correspond to a beacon frame in IEEE 802.11. Each transmission sequence contains a marker that may be used as a time reference. Terminal i receives two transmission sequences from access points P and Q and identifies the markers in the received transmission sequences. Terminal i measures the difference between the arrival time of marker $M_{Pi}$ from access point P and the arrival time of marker $M_{Qi}$ from access point Q. This arrival time difference is denoted as $OTD_i$. The location of terminal i may be determined based on OTD measurements for two or more pairs of access points with known locations. The location of an access point may also be determined based on OTD measurements from terminals with known locations.

A network server, e.g., network server 130 in FIG. 1, may instruct a terminal to make OTD measurements and may receive the measurements from the terminal. The network server may perform location-related computations to solve for the terminal locations and/or access point locations using OTD measurements.

The OTD method may be used for any WLAN technology that sends implicit or explicit timing-related information. The timing-related information may be provided via repeated frame structures, repeated frames, other identifiable information containing a counter or timing-related data, etc. The OTD method may be similar to an Enhanced Observed Time Difference (E-OTD) method for GSM networks, an Observed Time Difference of Arrival (OTDOA) method for WCDMA networks, and an Advanced Forward Link Trilateration (A-FLT) method for CDMA networks. The E-OTD, OTDOA and A-FLT methods only determine the locations of terminals and rely on having knowledge of the locations of base stations. In contrast, the OTD method can determine the locations of terminals as well as access points and may be used for WLAN as well as other wireless networks, e.g., GSM, WCDMA, and CDMA networks.

The TOA method provides a location estimate for a station based on TOA measurements for one or more other stations and known locations of the other stations. For example, a terminal may measure the time of arrival for a marker from each of multiple access points and may associate absolute time with each marker. The terminal may obtain absolute time using, e.g., GPS, A-GPS, etc. The location of the terminal may then be obtained based on the measurements using trilateration.

Figure 4:
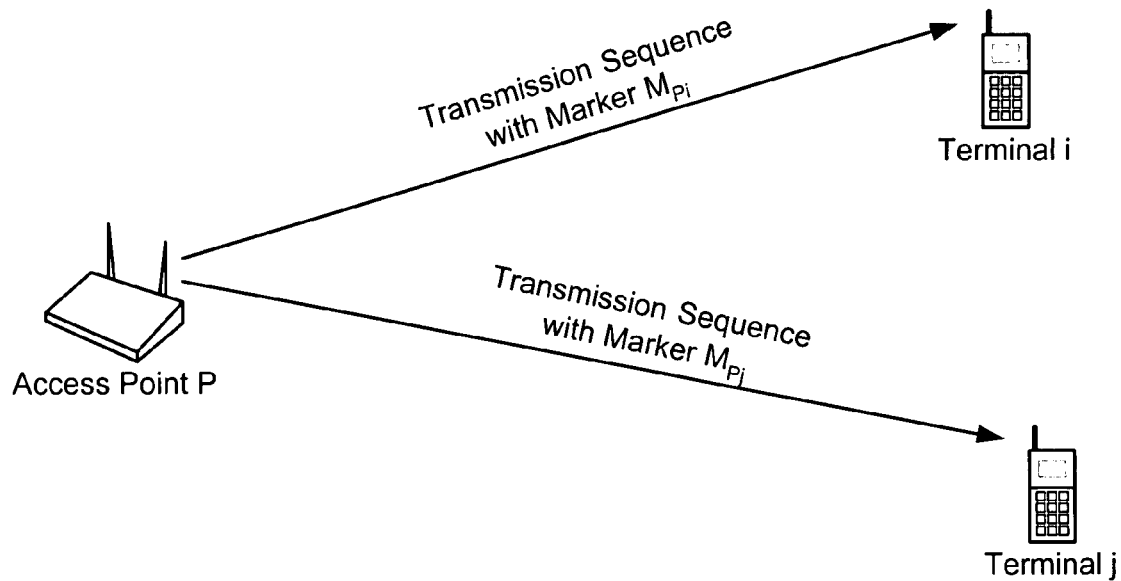
FIG. 4 shows TOA measurements by two terminals for an access point.

FIG. 4 shows TOA measurements by two terminals i and k at different locations for one access point P. Access point P transmits a series of transmission sequences, with each transmission sequence having a marker. Terminal i receives a transmission sequence from access point P. The marker in the sequence received by terminal i is denoted as $M_{Pi}$. Terminal j receives a transmission sequence from access point P. The marker in the sequence received by terminal j is denoted as $M_{Pj}$. Marker $M_{Pi}$ may be the same as or different from marker $M_{Pj}$. Each terminal m, for m=i or j, may determine an absolute arrival time $A(M_{Pm})$ of marker $M_{Pm}$ received by that terminal from access point P based on the terminal's knowledge of absolute time. $A(M_{Pm})$ represents the TOA measurement made by terminal m for access point P.

The OTD between the absolute arrival time of marker $M_{Pi}$ at terminal i and the absolute arrival time of marker $M_{Pj}$ at terminal j is denoted as $OTD_{ij}$. Three TOA measurements by three different terminals at different known locations may be used to form two equations (with one terminal common to both equations), which may then be used to determine the two unknown variables for the x, y coordinates of access point P. Three TOA measurements by a single terminal at different known locations may also be used to determine the x, y coordinates of the access point. The locations of access points determined based on the TOA method may be used to determine the locations of terminals using the RTD, OTD, TOA, or other positioning methods. The location of a terminal may also be determined using known locations of access points. In this case, three or more access points obtain absolute TOA measurements for transmission markers transmitted by the terminal.

A network server, e.g., network server 130 in FIG. 1, may instruct terminals and/or access points to perform TOA measurements and may receive the measurements from the terminals and/or access points. The network server may then perform location-related computations to determine the locations of the terminals and/or access points.

The signal strength/quality method provides a location estimate for a station based on signal strength and/or signal quality measurements for one or more other stations and known locations of the other stations. The location of the station may be determined using pattern matching, as described below.

A terminal may record the identities of all access points that can be received by the terminal at a particular location. The terminal may also measure the signal strength and/or signal quality for each access point received by the terminal. Signal strength may be quantified by received power and may be given in units of dBm. Signal quality may be quantified by signal-to-noise ratio (S/N), energy-per-bit-to-total-noise ratio (Eb/No), bit error rate (BER), packet error rate (PER), observed signaling errors, etc. Signal quality may be given by a binary value that indicates whether or not the signal quality is above a given threshold, e.g., whether the signal quality is sufficient to decode the AP identity. The location of the terminal may also be obtained using independent means, e.g., GPS, A-GPS, etc. The terminal may report its location, the identities of the received access points, and the signal strength/quality measurement for each access point.

A network server, e.g., network server 130 in FIG. 1, may receive reports from different terminals and/or reports from the same terminals at different locations. The network server may build up a database of access points received at different locations and the associated signal strengths/qualities. A geographic area of interest may be partitioned into small regions or pixels. The regions may have any shape (e.g., squares, rectangles, hexagons, etc.) and may also have any size (e.g., few meters across). The location reported by a terminal may be mapped to a single pixel (e.g., the pixel containing the terminal location coordinates) or to a small set of pixels (e.g., pixels included in a probable area in which the terminal is located). The access point identities and signal strengths/qualities may be associated with the pixel(s) to which the terminal location is mapped. If reports are obtained from multiple terminals for the same pixel or set of pixels, then the measurements in these reports may be combined (e.g., averaged), and the combined measurements may be stored for the pixel(s). For example, signal strengths may be averaged using a moving weighted time average, where the weights may depend on the probability that a given terminal location is correctly mapped to a particular pixel. Signal qualities may also be averaged. For example, if one signal quality threshold is used, then the overall signal quality may relate to the percentage of terminals for which the threshold was exceeded.

The database may be used for positioning of terminals. The network server may obtain from a terminal the identities of access points received by the terminal and possibly signal strengths/qualities for these access points. The network server may search the database for pixels marked with the reported access point identities. The network server may look for partial pattern matches for the access points identified by the terminal and may ignore access points not identified. The network server may then identify pixels associated with averaged signal strengths/qualities that most closely match the reported signal strengths/qualities. The network server may take into account the fact that the sensitivity of different terminals may vary. The result of the search may be a set of pixels, not necessarily contiguous, representing possible locations for the terminal together with the probability that each pixel was in fact the correct location. The network server may derive a single location estimate that minimizes the expected location error (or the root mean square of the error).

The network server may instruct terminals to obtain signal strength/quality measurements and may receive the measurements from these terminals. The network server may build up and/or update the database and perform location-related computations to determine the locations of terminals.

The A-GPS method provides GPS assistance data to terminals to assist the terminals acquire and measure GPS signals and/or to compute location estimates from the resultant measurements. GPS assistance data may also be used to support positioning with other satellite positioning systems such as the European Galileo system. An approximate location of a terminal is typically needed in order to provide appropriate GPS assistance data to the terminal. For example, knowledge of the terminal location to within few kilometers is needed to provide acquisition assistance data and GPS-GSM or GPS-WCDMA timing assistance data used to support A-GPS in GSM and WCDMA networks. Any of the positioning methods described herein may be used to determine the location of the terminal with the required level of accuracy.

For a cell ID method, a terminal obtains globally unique identities of one or more cells in a cellular network such as a GSM, WCDMA, or CDMA network. An access point serving the terminal or a network serving the terminal via the WLAN may also provide the terminal with identities of cells with coverage in the terminal's location. A cell identity may be mapped to a specific location within a cell, e.g., the location of the cell site antenna. This cell location may be provided as a coarse location estimate for terminals within the cell. The location estimate has an error determined by the size of the cell.

The location of a station (e.g., a terminal or an access point) may be determined using multiple positioning methods. A more accurate and reliable location estimate may be obtained for the station by combining location results from these multiple positioning methods. For the signal strength/quality method, the location result may be a set of possible locations (e.g., pixels), each with an associated probability of occurrence. For the RTD, OTD and TOA methods as well as the GPS and A-GPS methods, the result may be a single location with a surrounding area (e.g., a circle or ellipse) within which the actual location is expected with a particular probability. Each location result may be converted to a probability density function (PDF) that provides, for each possible location, the probability that the station is actually at that location. The probability density functions for all positioning methods may be combined and used to obtain a final location estimate for the station.

A network server may obtain from a terminal several sets of measurements for different positioning methods such as, e.g., A-GPS, RTD, OTD, TOA, signal strength/quality, etc. The network server may perform location-related computations for each positioning method and may combine the results for all positioning methods into more accurate location information as described above.

The positioning methods in Table I are described in further detail in commonly assigned U.S. patent application Ser. No. 11/557,451, entitled "POSITIONING FOR WLANS AND OTHER WIRELESS NETWORKS," filed Nov. 7, 2006.

The positioning methods described herein may be supported by terminals, access points, and/or other network entities associated with a WLAN. Positioning for a terminal may occur locally. An entity may request the terminal location from the terminal or the WLAN, e.g., the access point.

It may be more efficient to support positioning of terminals in WLANs by extending existing capabilities of wireless user plane location solutions such as SUPL and 3GPP2 X.S0024. The user plane location solutions may be used to support positioning for terminals, store and provide location results, support privacy for a terminal user, support authentication of an entity requesting a terminal location, etc. The user plane location solutions currently support a number of positioning methods such as cell ID with timing advance, E-OTD, OTDOA, and A-FLT, which are applicable to WWANs (e.g., GSM, WCDMA, and CDMA networks) but not WLANs. The user plane location solutions also support other positioning methods such as GPS and A-GPS, which are applicable to various wireless networks where specialized WLAN support is not needed. The user plane location solutions may be enhanced to support positioning methods for WLAN.

Figure 5:
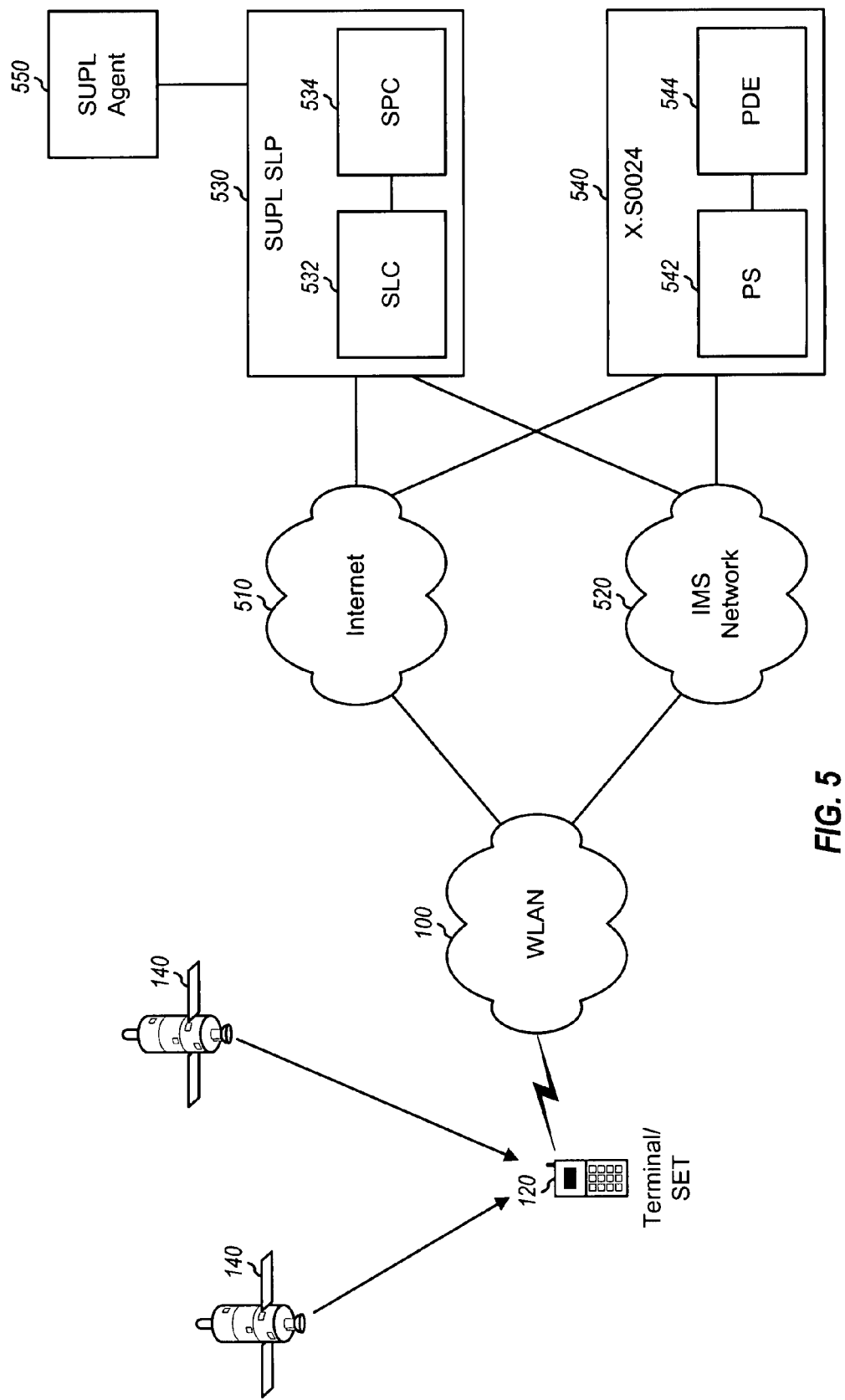
FIG. 5 shows a deployment with user plane location.

FIG. 5 shows a deployment with SUPL and X.S0024. A terminal 120 may use WLAN 100 to access the Internet 510, an IP Multimedia Subsystem (IMS) network 520 in 3GPP or 3GPP2, or other 3GPP or 3GPP2 services as described in 3GPP TS 23.234 and 3GPP2 X.P0028. Terminal 120 may communicate with WLAN 100, which may be used as a Generic Access Network (GAN) to support access to GSM and GPRS as described in 3GPP TS 43.318. Terminal 120 may use WLAN positioning methods within SUPL or X.S0024 when communicating with WLAN 100. In SUPL, a terminal is referred to as a SUPL Enabled Terminal (SET). The terms "terminal" and "SET" are used interchangeably below.

SUPL utilizes a SUPL Location Platform (SLP) 530 that is responsible for SUPL service management and positioning. SLP 530 may be a Home SLP (H-SLP), a Visited SLP (V-SLP), an Emergency SLP (E-SLP), etc. SUPL service management may include managing locations of SETs and storing, extracting, and modifying location information of target SETs. SLP 530 includes a SUPL Location Center (SLC) 532 and may include a SUPL Positioning Center (SPC) 534. SLC 532 performs various functions for location services, coordinates the operation of SUPL, and interacts with SETs over user plane bearer. SLC 532 may perform functions for privacy, initiation, security, roaming support, charging/billing, service management, position calculation, etc. SPC 534 supports positioning for SETs, is responsible for messages and procedures used for position calculation, and supports delivery of assistance data to the SETs. SPC 534 may perform functions for security, assistance data delivery, reference retrieval, position calculation, etc. SPC 534 has access to GPS receivers (a reference network, perhaps a global one) and receives signals for satellites so that it can provide assistance data.

A SUPL agent 550 may communicate with SLP 530 to obtain location information for terminal/SET 120. A SUPL agent is a service access point that accesses network resources to obtain location information. Location information may comprise a location estimate and/or any information related to location. SET 120 may also have a SUPL agent that is resident within the SET. SUPL Version 2.0 (SUPL 2.0) is described in OMA-AD-SUPL-V2, entitled "Secure User Plane Location Architecture," Aug. 31, 2007, and OMA-TS-ULP-V2, entitled "UserPlane Location Protocol," Sep. 27, 2007. These SUPL documents are publicly available from OMA.

X.S0024 utilizes location entities 540 that may include an X.S0024 Position Server (PS) 542 and an X.S0024 Position Determining Entity (PDE) 544. PS 542 may perform functions similar to those performed by SLC 532. PDE 544 may perform functions similar to those performed by SPC 534.

Figure 6A:
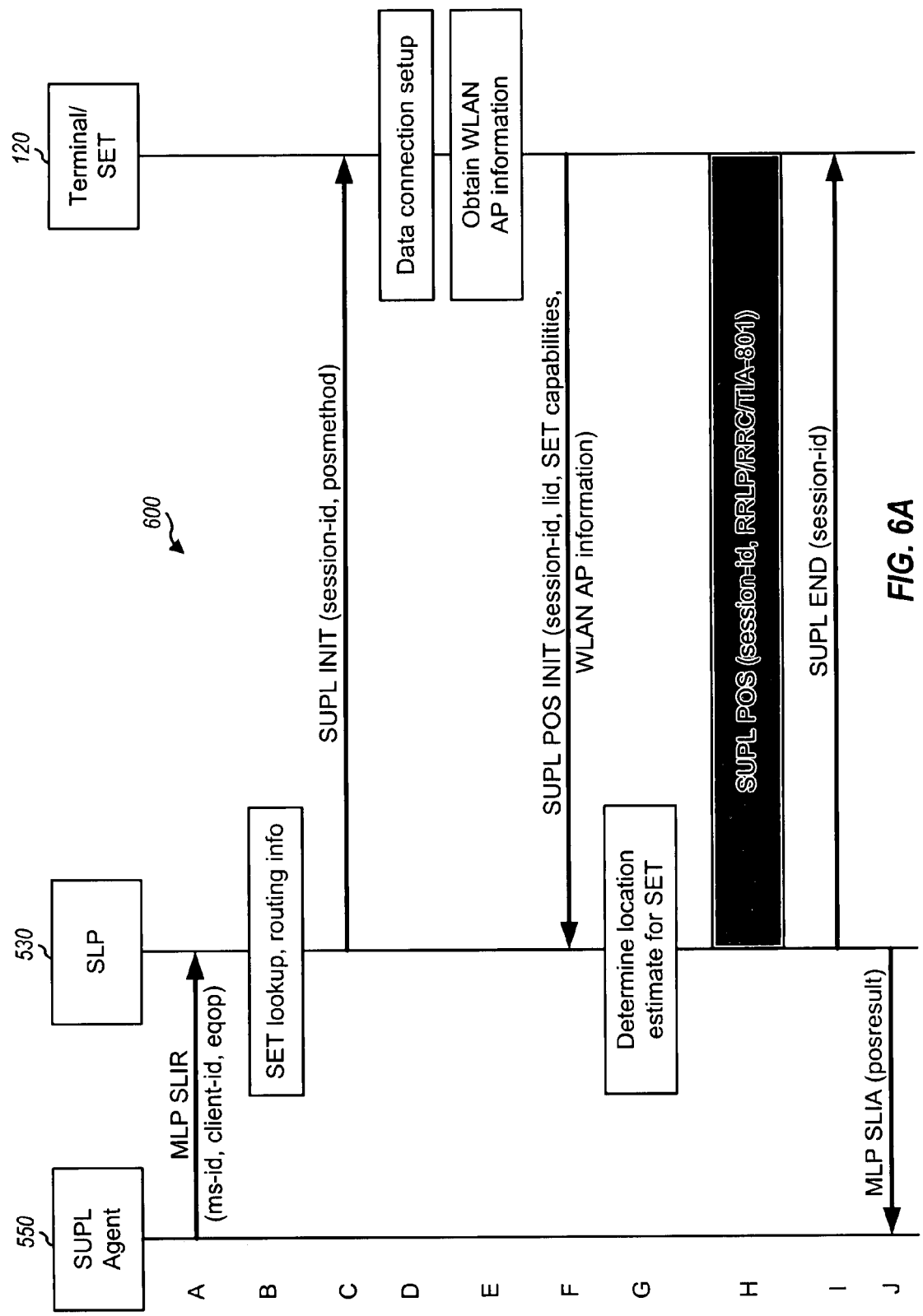
FIGS. 6A and 6B show message flows for network-initiated and SET-initiated location services in SUPL with WLAN positioning.

FIG. 6A shows a design of a message flow 600 for network-initiated location services in SUPL with WLAN positioning. SUPL agent 550 may desire location information for SET 120 and may send a Mobile Location Protocol (MLP) Standard Location Immediate Request (SLIR) message to SLP 530 (step A). SLP 530 may authenticate and authorize SUPL agent 550 for the requested location information. SLP 530 may then obtain routing information for SET 120 (step B).

SLP 530 may send a SUPL INIT message to initiate a location session with SET 120 (step C). The SUPL INIT message may include a session-id used to identify the location session, an intended positioning method, the desired quality of positioning (QoP), etc. Upon receiving the SUPL INIT message, SET 120 may perform a data connection setup procedure, attach itself to a packet data network if the SET is not already attached, and establish a secure IP connection to SLP 530 (step D).

SET 120 may then obtain WLAN AP information. In general, WLAN AP information may include any information for an access point and/or a terminal that may be pertinent for positioning of the terminal. For example, the WLAN AP information may comprise parameters of an access point, e.g., an AP ID (MAC address) and a number of optional WLAN associated measurements defined according to IEEE 802.11v, which provides positioning support for all IEEE 802.11 radio technologies. SET 120 may then send a SUPL POS INIT message to SLP 530 (step F). The SUPL POS INIT message may include the session-id, the WLAN AP information, and possibly other information such as the SET capabilities (e.g., supported positioning methods and protocols), request for assistance data, etc. SLP 530 may determine a location estimate for SET 120 based on the WLAN AP information (step G). If the location estimate obtained from the WLAN AP information is of sufficient quality, then SLP 530 may send a SUPL END message to SET 120 (step I) and may send the requested location information in an MLP Standard Location Immediate Answer (SLIA) message to SUPL agent 550 (step J).

If a location estimate of sufficient quality is not obtained based on the WLAN AP information, then SLP 530 and SET 120 may exchange messages for a positioning session (step H). For SET-assisted positioning, SLP 530 may calculate a location estimate for SET 120 based on positioning measurements received from the SET. For SET-based positioning, SET 120 may calculate the location estimate based on assistance obtained from SLP 530. In any case, upon completing the positioning session, SLP 530 may send a SUPL END message to SET 120 (step I) and may also send the requested location information to SUPL agent 550 (step J).

Figure 6B:
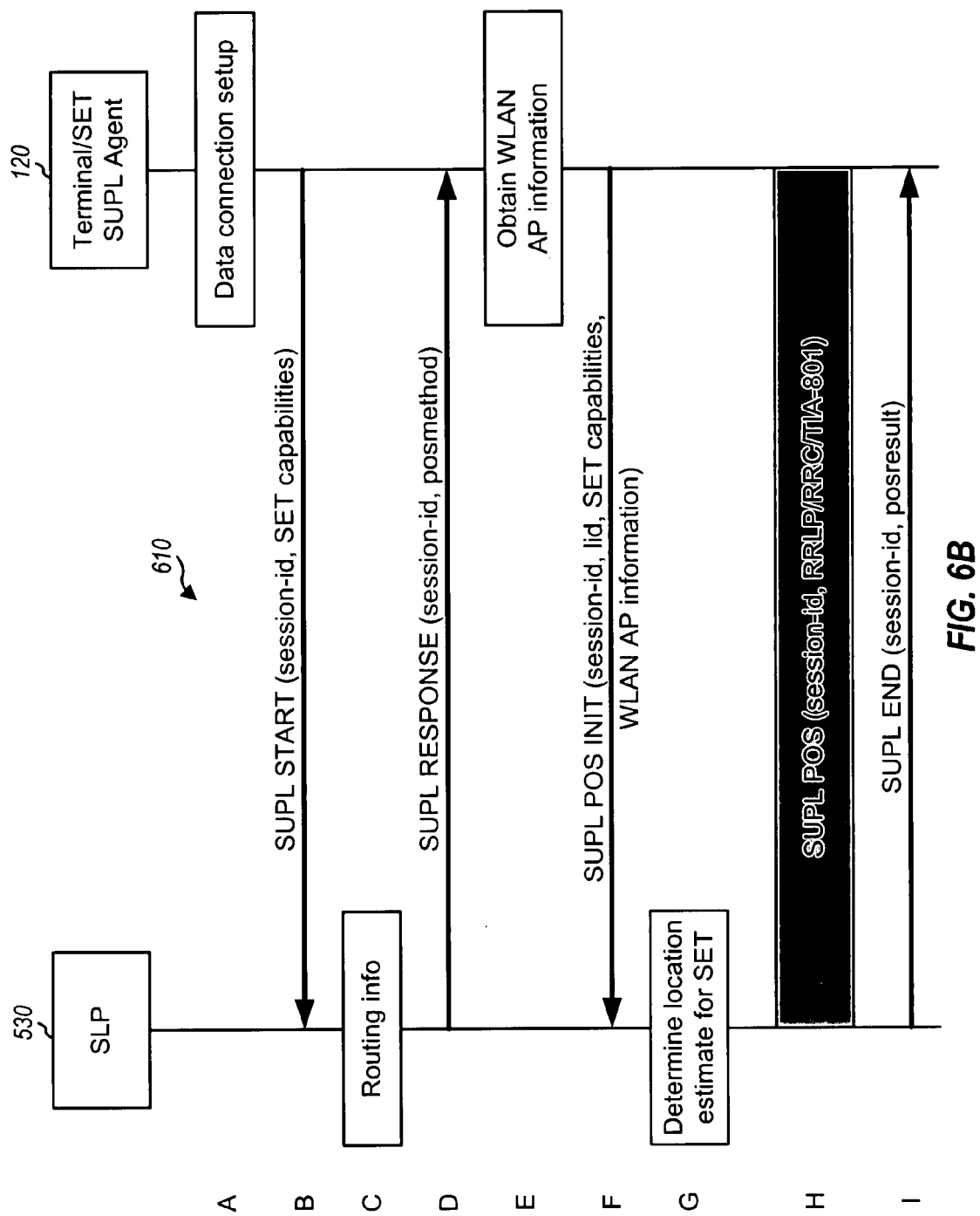

FIG. 6B shows a design of a message flow 610 for SET-initiated location services in SUPL with WLAN positioning. A SUPL agent on SET 120 may receive a request for location information from an application running on the SET. SET 120 may perform a data connection setup procedure, attach itself to a packet data network if necessary, and establish a secure IP connection to SLP 530 (step A). SET 120 may then send a SUPL START message to initiate a location session with SLP 530 (step B). The SUPL START message may include a session-id, the SET capabilities, etc. SLP 530 may determine that SET 120 is currently not roaming for SUPL (step C). SLP 530 may then send to SET 120 a SUPL RESPONSE message that may include the session-id, the selected positioning method, etc. (step D).

SET 120 may obtain WLAN AP information (step E, which may occur any time). SET 120 may then send to SLP 530 a SUPL POS INIT message that may include the session-id, the WLAN AP information, and possibly other information (step F). SLP 530 may determine a location estimate for SET 120 based on the WLAN AP information (step G). If the location estimate is of sufficient quality, then SLP 530 may send to SET 120 a SUPL END message that may include the requested location information (step I). If a location estimate of sufficient quality is not obtained based on the WLAN AP information, then SLP 530 and SET 120 may exchange messages for a positioning session (step H). Upon completing the positioning session, SLP 530 may send a SUPL END message with the requested location information to SET 120 (step I).

The WLAN positioning methods described herein may be supported in SUPL or X.S0024 by having new identifiers for these positioning methods in SUPL and X.S0024 and/or by enabling new location-related measurements to be sent from terminals to SUPL or X.S0024 entities. For terminal-based positioning, a terminal performs measurements and computes a location estimate. In this case, the SUPL SLP or SPC and the X.S0024 PS or PDE may send WLAN assistance data to assist the terminal make measurements and/or compute a location estimate. The WLAN assistance data may comprise, e.g., location coordinates of access points, RTD values for the OTD method, etc.

Table 2 lists signaling that may be included in OMA SUPL to support the WLAN positioning methods described herein. For the Cell ID method, cell identity may already be included in the SUPL START and SUPL POS INIT messages but may be expanded with new parameters shown in Table 2. The location-related information shown in Table 2 may also be included in other SUPL parameters and messages.

TABLE 2

| WLAN Position Method | SUPL Parameter | SUPL Message | Description |
| --- | --- | --- | --- |
| AP ID, RTD, OTD, TOA and signal strength quality | Positioning method | SUPL INIT, SUPL RESPONSE | An identifier is used for each WLAN positioning method, e.g., AP ID, RTD, OTD, TOA, signal strength/quality, etc. |
| | SET capabilities | SUPL START, SUPL POS INIT | An identifier is used for each WLAN positioning method supported by a terminal. |
| | Location ID | SUPL START, SUPL POS INIT | Serving AP identity, e.g., MAC address, IP address, etc. |
| | Location ID or new parameter | SUPL START, SUPL POS INIT | Serving AP location coordinates reported by the AP, e.g., from beacon frame in IEEE 802.11. |
| | Location ID or new parameter | SUPL START, SUPL POS INIT | WLAN technology/device type, e.g., 802.11b, 802.11g, 802.11n, WiMAX, etc. |
| | Location ID or new parameter | SUPL START, SUPL POS INIT | Transmit power used by a terminal and/or an AP for communication, antenna gain, received signal strength, received signal quality, etc. |
| RTD | Positioning payload, or new SUPL parameter | SUPL POS (from SET to SLP or SPC) | Provide RTD measurement for serving AP, RTD measurements plus AP identities for other APs, etc. |
| | Positioning payload or new SUPL parameter | SUPL RESPONSE, SUPL POS (from SLP or SPC to SET) | Provide serving AP location coordinates, location coordinates plus AP identities for other APs, etc. |
| OTD | Positioning payload, or new SUPL parameter | SUPL POS (from SET to SLP or SPC) | Provide reference AP identity (default is serving AP) and one or more other AP identities. For each other AP identity, provide measured OTD value between this AP and the reference AP, statistics of |

TABLE 2-continued

| WLAN Position Method | SUPL Parameter | SUPL Message | Description |
|---|---|---|---|
| | Positioning payload or new SUPL parameter | SUPL RESPONSE, SUPL POS (from SLP or SPC to SET) | measurement accuracy and reliability, etc. Provide identities and characteristics of APs that can be measured by a terminal, RTD values between identified APs, locations of identified APs, etc. |
| TOA | Location ID, positioning payload, or new SUPL parameter | SUPL POS INIT, SUPL POS (from SET to SLP or SPC) | Provide absolute TOA (e.g., GPS time) for a signal from serving AP and identity and relative timing (e.g., frame number) of this signal, TOAs for other identified signals from other identified APs, etc. |
| | Positioning payload or new SUPL parameter | SUPL RESPONSE, SUPL POS (from SLP or SPC to SET) | Provide identities and characteristics of APs that can be measured by a terminal, expected TOA values, locations of identified APs and their absolute timing relationship (e.g., to GPS), etc. |
| Signal strength/ quality | Positioning payload, or new SUPL parameter | SUPL POS (from SET to SLP or SPC) | Provide signal strength and/or signal quality for the serving AP, signal strengths and/or qualities for other identified APs, terminal location, etc. |
| | Positioning payload or new SUPL parameter | SUPL RESPONSE, SUPL POS (from SLP or SPC to SET) | Provide location result corresponding to signal strength/quality for a set of pixels contained in a local area in which the terminal is located, etc. |
| Cell ID (e.g., for A-GPS) | Location ID, positioning payload, or new SUPL parameter | SUPL POS INIT, SUPL POS (from SET to SLP or SPC) | Provide global cell ID(s) for cellular networks, TA, RTD, signal strength/quality measurements for each provided cell ID, etc. |
| | Positioning payload or new SUPL parameter | SUPL RESPONSE, SUPL POS (from SLP or SPC to SET) | Provide request for cell ID information and indicate if TA, RTD, signal strength/quality measurements are needed, etc. |

The positioning payload referred to in Table 2 may be a Radio Resource LCS Protocol (RRLP) message in 3GPP, a Radio Resource Control (RRC) message in 3GPP, a TIA-881 message in 3GPP2, etc.

In one design, a terminal/SET may send WLAN AP information to an SLP for any of the WLAN positioning methods described herein. The WLAN AP information may be sent in a Location ID parameter or a Multiple Location IDs parameter, which may be included in any of the SUPL messages in Table 3.

TABLE 3

| SUPL Message | Description |
|---|---|
| SUPL START | Sent by a SET for a SET-initiated SUPL session. |
| SUPL POS INIT | Sent by a SET following a SUPL INIT message for a network-initiated SUPL session or a SUPL RESPONSE message for a SET-initiated SUPL session. |
| SUPL TRIGGERED START | Sent by a SET to start a triggered SUPL session. |

Tables for various parameters in SUPL messages are given below. In a table for a given SUPL parameter, the first row of the table gives a short description of the SUPL parameter. Subsequent rows give different fields/parameters of the SUPL parameter, with each field being indicated by symbol ">". A given field/parameter may have subfields, with each subfield being indicated by symbol ">>". In a Presence column of the table, an "M" indicates that a field/parameter is mandatory, an "O" indicates that the field/parameter is optional, and a "CV" indicates that the field/parameter is conditional on value.

In one design, the Location ID parameter may include any of the information shown in Table 4. The Cell Info parameter may include GSM cell information, WCDMA cell information, CDMA cell information, or WLAN AP information. The Status parameter may indicate the status of the cell/AP information included in the Cell Info parameter.

TABLE 4

| Location ID Parameter | | |
|---|---|---|
| Parameter | Presence | Value/Description |
| Location ID | — | Describes the globally unique cell or WLAN AP identification of the most current serving cell or serving WLAN AP. |
| >Cell Info | M | The following cell IDs are supported: GSM Cell Info WCDMA Cell Info CDMA Cell Info WLAN AP Info |
| >Status | M | Describes whether or not the cell or WLAN AP info is: Not Current, last known cell/AP info Current, the present cell/AP info |

TABLE 4-continued

Location ID Parameter

| Parameter | Presence | Value/Description |
|---|---|---|
| | | Unknown (i.e. not known whether the cell/AP id is current or not current) |

NOTE: The Status parameter does not apply to WCDMA optional parameters (Frequency Info, Primary Scrambling Code and Measured Results List). Frequency Info, Primary Scrambling Code and Measured Results List, if present, are always considered to be correct for the current cell.

In one design, the WLAN AP information sent by a SET in the Cell Info parameter of the Location ID parameter in Table 4 may include any of the information shown in Table 5.

TABLE 5

WLAN AP Information Parameter

| Parameter | Presence | Value/Description |
|---|---|---|
| WLAN AP Info | — | WLAN Access Point ID |
| >AP MAC Address | M | Access Point MAC Address |
| >AP Transmit Power | O | AP transmit power in dBm |
| >AP Antenna Gain | O | AP antenna gain in dBi |
| >AP S/N | O | AP S/N received at the SET in dB |
| >Device Type | O | Options are: 802.11a device, 802.11b device, and 802.11g device. Future networks are permitted. |
| >AP Signal Strength | O | AP signal strength received at the SET in dBm |
| >AP Channel/Frequency | O | AP channel/frequency of Tx/Rx |
| >Round Trip Delay | O | Round Trip Delay (RTD) between the SET and AP |
| >>RTD Value | M | Measured RTD value |
| >>RTD Units | M | Units for RTD value and RTD accuracy - 0.1, 1, 10, 100 or 1000 nanoseconds |
| >>RTD Accuracy | O | RTD standard deviation in relative units |
| >SET Transmit Power | O | SET transmit power in dBm |
| >SET Antenna Gain | O | SET antenna gain in dBi |
| >SET S/N | O | SET S/N received at the AP in dB |
| >SET Signal Strength | O | SET signal strength received at the AP in dBm |
| >AP Reported Location | O | Location of the AP as reported by the AP |
| >>Location Encoding | M | Location encoding description LCI as per RFC 3825 Text as per RFC 4119 ASN.1 as per X.694 |
| >>Location Data | M | Location Data |
| >>>Location Accuracy | O | Location Accuracy in units of 0.1 meter |
| >>>Location Value | M | Location value in the format defined in Location Encoding |

In one design, the Multiple Location IDs parameter may include any of the information shown in Table 6. The Multiple Location IDs parameter may include individual Location IDs for different radio access networks and may be obtained at the same time or different times.

TABLE 6

Multiple Location IDs Parameter

| Parameter | Presence | Value/Description |
|---|---|---|
| Multiple Location ID | — | This parameter contains a set of up to MaxLidSize Location ID/Relative Timestamp data. |
| Location ID | M | Describes measured globally unique cell/AP identification of the serving cell/AP or cell/AP identification from any receivable radio network. The measured cell/AP identifications may be from different radio access networks measured at the same time or at different times. |
| Relative Timestamp | CV | Time stamp of measured location Id relative to "current location id" in units of 0.01 sec. Range from 0 to 65535*0.01 sec. Time stamp for current Location Id if present is 0. The Relative Timestamp is present if the Location ID info is historical and may be omitted if the Location ID info is current. |
| Serving Cell Flag | M | This flag indicates whether the Location ID info represents a serving cell or WLAN AP or an idle (i.e., camped-on) cell or WLAN AP. If set, the Location ID info represents serving cell or WLAN AP information. If not set, the Location ID info represents idle mode information or neighbor cell or WLAN AP information. |

With the features in Tables 2 through 6, an SLP may support the WLAN positioning methods described above. The SLP may also function as a network server for WLAN positioning methods and perform the operations described above. A SET may function as an identified/target terminal/SET. Different or additional signaling and features may also be provided in SUPL to support WLAN positioning methods.

Similar signaling and features may also be provided in X.S0024. An X.S0024 PS or PDE may support the WLAN positioning methods described above. The PS may function as a network server for WLAN positioning methods and perform the operations described above. A mobile station (MS) may function as an identified/target terminal.

Figures 7, 8:
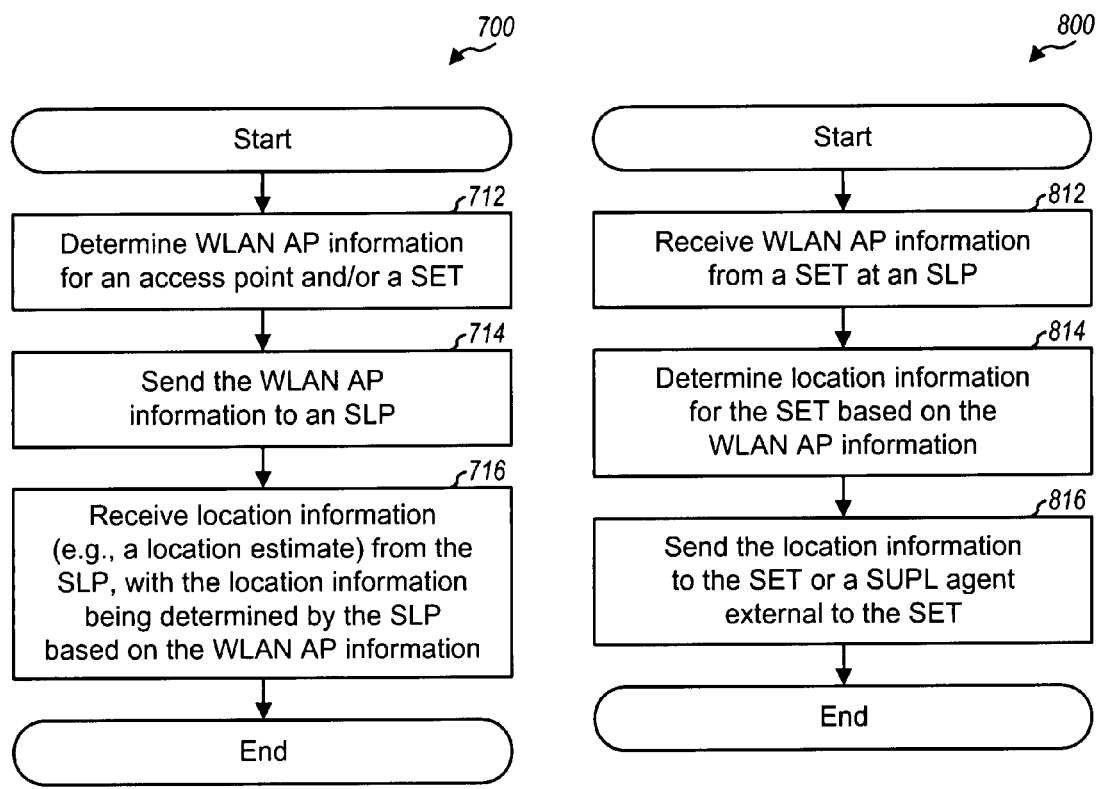
FIG. 7 shows a process performed by a terminal for WLAN positioning in SUPL.
FIG. 8 shows a process performed by an SLP to support WLAN positioning in SUPL.

FIG. 7 shows a design of a process 700 performed by a terminal/SET for WLAN positioning in SUPL. WLAN AP information for an access point in a WLAN and/or the SET may be determined (block 712). For block 712, measurements for signal strength, S/N, RTD, and/or some other quantity may be obtained for the access point. Alternatively or additionally, measurements for signal strength, S/N, and/or some other quantity, which may be made by the access point for the SET, may be received. In any case, the WLAN AP information may be determined based on the measurements. The WLAN AP information may comprise any of the information shown in Table 5 and/or other information.

The WLAN AP information may be sent to an SLP (block 714). For a network-initiated SUPL session, a SUPL INIT message may be received from the SLP, and a SUPL POS INIT message comprising the WLAN AP information may be sent to the SLP, e.g., as shown in FIG. 6A. For a SET-initiated SUPL session, a SUPL START message or a SUPL POS INIT message comprising the WLAN AP information may be sent to the SLP, e.g., as shown in FIG. 6B. For a SET-initiated SUPL session, location information (e.g., a location estimate for the SET) may be received from the SLP, with the location information being determined by the SLP based on the WLAN AP information (block 716).

FIG. 8 shows a design of a process 800 performed by an SLP to support WLAN positioning in SUPL. WLAN AP information may be received from a SET at the SLP (block 812). The WLAN AP information may comprise any of the information shown in Table 5 and/or other information. The WLAN AP information may be received in a SUPL START message, a SUPL POS INIT message, or a SUPL TRIGGERED START message. Location information for the SET may be determined based on the WLAN AP information (block 814). The location information may be sent to the SET or a SUPL agent external to the SET (block 816).

A terminal/SET may be capable of communicating with different radio access networks and/or may support different positioning methods. An SLP may also support different positioning methods, which may or may not match the positioning methods supported by the SET.

Figure 9:
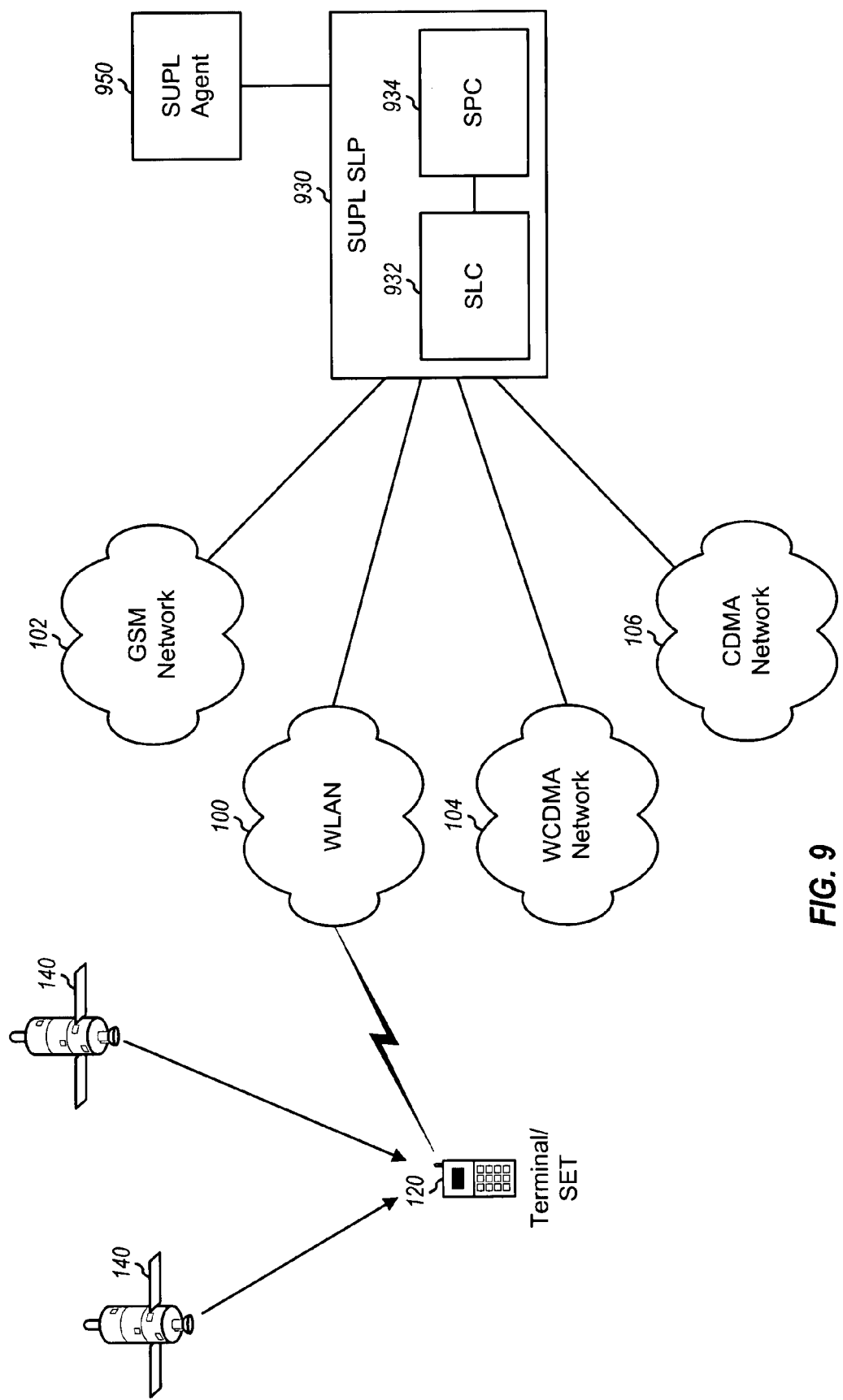
FIG. 9 shows a network deployment with different radio access networks.

FIG. 9 shows an example network deployment with different radio access networks. A terminal/SET 120 may communicate with WLAN 100, a GSM network 102, a WCDMA network 104, or a CDMA network 106 at any given moment to obtain communication services. SET 120 may receive and measure signals from access points or base stations in the current radio access network to obtain timing measurements for the access points or base stations. SET 120 may also receive and measure signals from one or more satellites 140 to obtain pseudo-range measurements for the satellites.

An SLP 930 may communicate with WLAN 100, GSM network 102, WCDMA network 104, and/or CDMA network 106 either directly (as shown in FIG. 9) or indirectly via another network (e.g., as shown in FIG. 5). SLP 930 may also be part of radio access network 100, 102, 104 or 106. SLP 930 may include SLC 932 and SPC 934 and may support location services and positioning for SETs communicating with radio access networks 100, 102, 104 and 106. A SUPL agent 950 may communicate with SLP 930 to obtain location information for SET 120.

In an aspect, an SLP may send supported network information to a SET to inform the SET of the type(s) of network measurement information supported by the SLP. The supported network information may be used as a filter in terms of which network measurement information the SET can send to the SLP. The SET may send only the network measurement information supported by the SLP in a Location ID parameter or a Multiple Location IDs parameter to the SLP. The supported network information parameter may also be used as reporting criteria for stored historical enhanced cell/sector measurements.

Figure 10A:
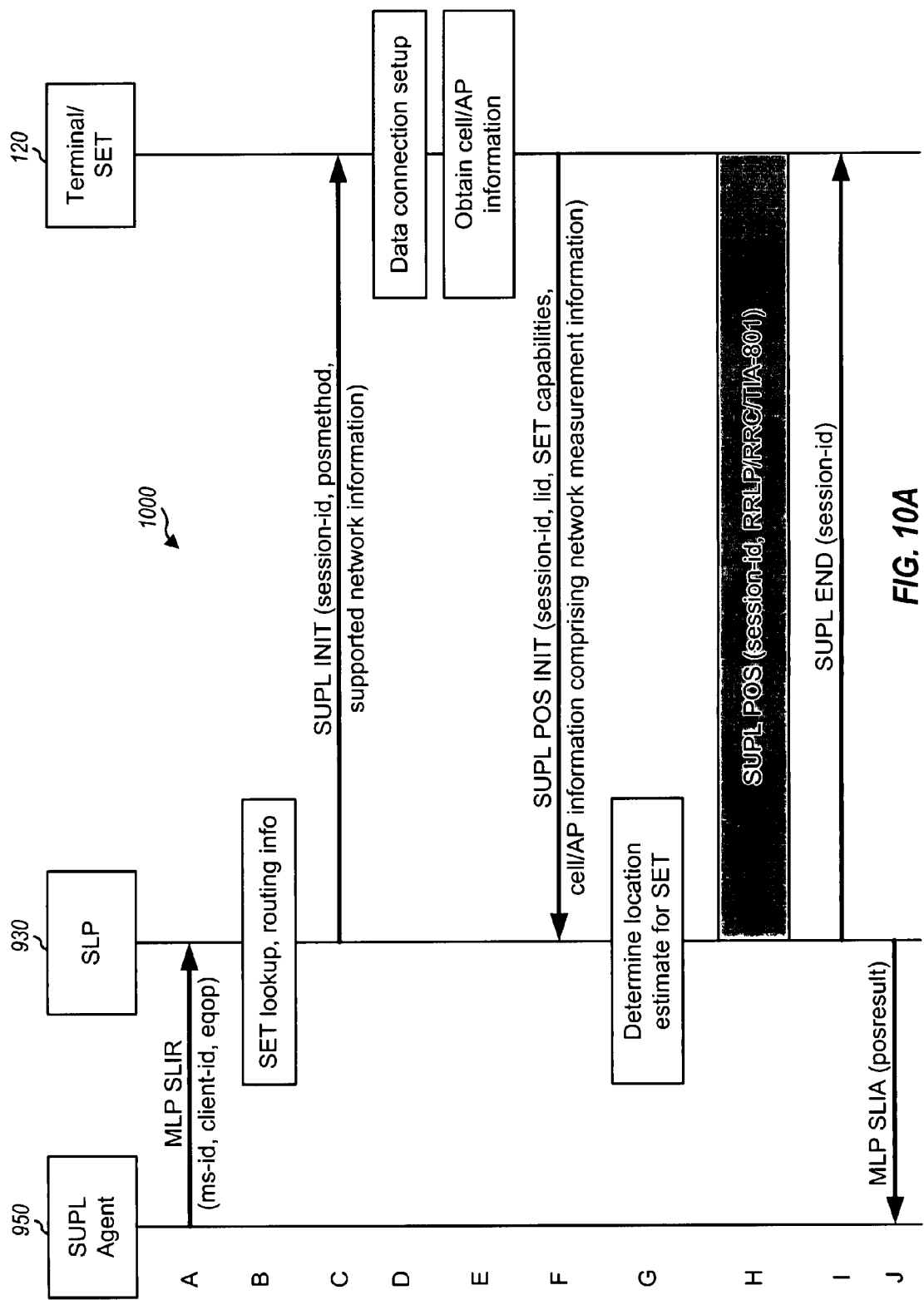
FIGS. 10A and 10B show message flows for network-initiated and SET-initiated location services in SUPL with supported network information.

FIG. 10A shows a design of a message flow 1000 for network-initiated location services in SUPL using supported network information. SUPL agent 950 may desire location information for SET 120 and may send a location request to SLP 930 (step A). SLP 930 may authenticate and authorize SUPL agent 950 and obtain routing information for SET 120 (step B). SLP 930 may then send to SET 120 a SUPL INIT message that may include a session-id, an intended positioning method, supported network information, etc. (step C). SET 120 may perform a data connection setup procedure, attach itself to a packet data network if necessary, and establish a secure IP connection to SLP 930 (step D).

SET 120 may obtain cell or AP information for the radio access network with which SET 120 currently communicates (step E). SET 120 may then send to SLP 930 a SUPL POS INIT message that may include the session-id, the cell/AP information comprising network measurement information permitted by the supported network information received from SLP 930, and possibly other information (step F). SLP 930 may determine a location estimate for SET 120 based on the cell/AP information received from SET 120 (step G). If the location estimate obtained from the cell/AP information is of sufficient quality, then SLP 930 may send a SUPL END message to SET 120 (step I) and may send the requested location information to SUPL agent 950 (step J). Otherwise, if a location estimate of sufficient quality is not obtained based on the cell/AP information, then SLP 930 and SET 120 may exchange messages for a positioning session (step H). Upon completing the positioning session, SLP 930 may send a SUPL END message to SET 120 (step I) and may send the location information to SUPL agent 950 (step J).

Figure 10B:
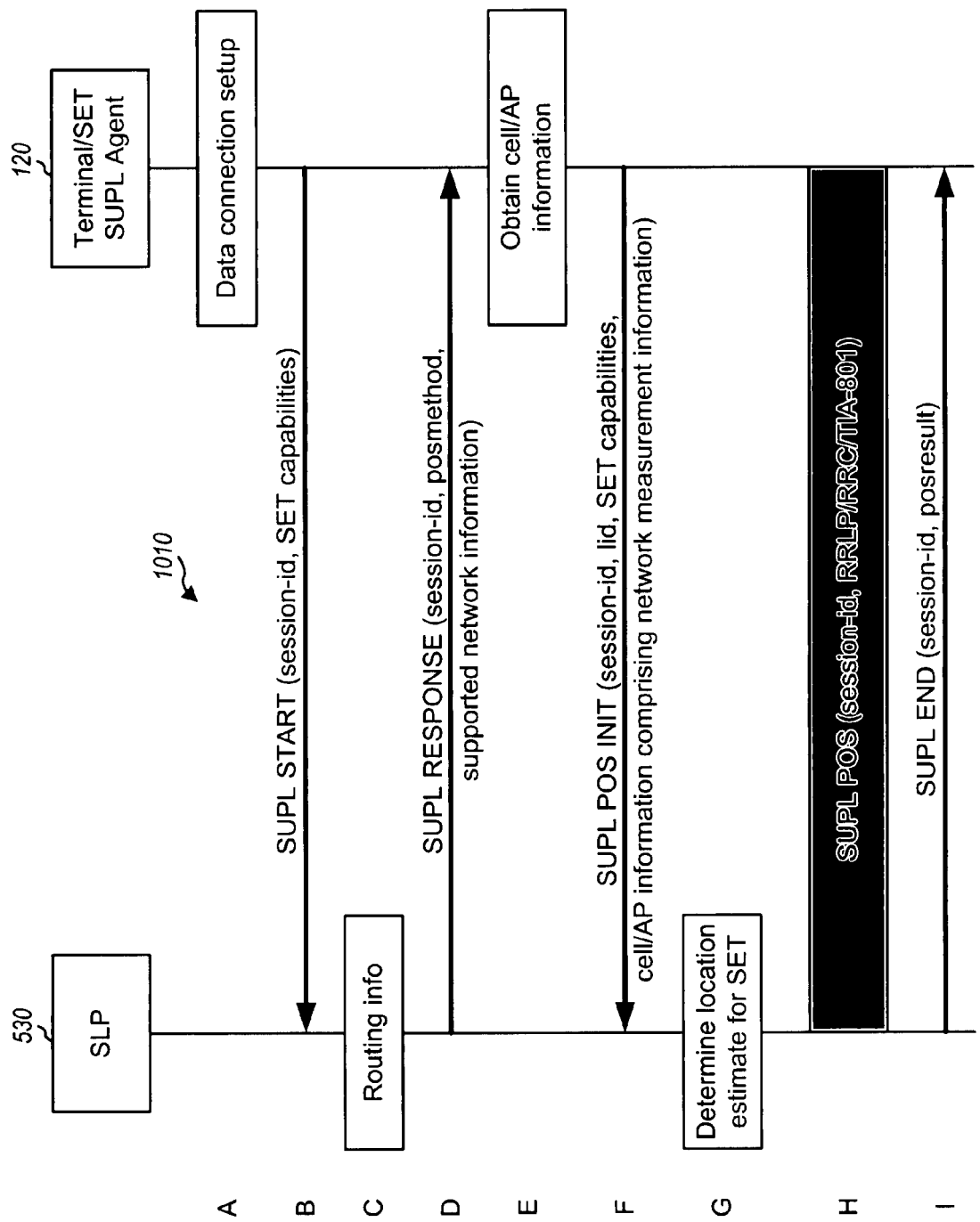

FIG. 10B shows a design of a message flow 1010 for SET-initiated location services in SUPL using supported network information. A SUPL agent on SET 120 may receive a request for location information. SET 120 may perform a data connection setup procedure, attach itself to a packet data network if necessary, and establish a secure IP connection to SLP 930 (step A). SET 120 may send to SLP 930 a SUPL START message that may include a session-id, the SET capabilities, etc. (step B). SLP 930 may determine that SET 120 is currently not roaming for SUPL (step C). SLP 930 may then send to SET 120 a SUPL RESPONSE message that may include the session-id, a selected positioning method, the supported network information, etc. (step D).

SET 120 may obtain cell or AP information for the radio access network with which SET 120 currently communicates (step E, which may occur any time). SET 120 may then send to SLP 930 a SUPL POS INIT message that may include the session-id, the cell/AP information comprising network measurement information permitted by the supported network information received from SLP 930, and possibly other information (step F). SLP 930 may determine a location estimate for SET 120 based on the cell/AP information received from SET 120 (step G). If the location estimate is of sufficient quality, then SLP 930 may send to SET 120 a SUPL END message that may include the requested location information (step I). If a location estimate of sufficient quality is not obtained based on the cell/AP information, then SLP 930 and SET 120 may exchange messages for a positioning session (step H). Upon completing the positioning session, SLP 930 may send a SUPL END message with the requested location information to SET 120 (step I).

In one design, an SLP may send supported network information to a SET in any of the SUPL messages in Table 7.

TABLE 7

| SUPL Message | Description |
| --- | --- |
| SUPL INIT | Sent by an SLP for a network-initiated SUPL session. |
| SUPL RESPONSE | Sent by an SLP in response to a SUPL START message sent by a SET for a SET-initiated SUPL session. |

TABLE 7-continued

| SUPL Message | Description |
| --- | --- |
| SUPL TRIGGERED RESPONSE | Sent by an SLP in response to a SUPL TRIGGERED START message sent by a SET for a triggered SUPL session. |

In one design, the supported network information sent by an SLP to a SET may include any of the information shown in Table 8.

TABLE 8

Supported Network Information Parameter

| Parameter | Presence | Value/Description |
| --- | --- | --- |
| WLAN | M | The value of this parameter is "true" or "false". If "true", it indicates the SET is allowed to send WLAN AP information within the Multiple Location IDs. If "false", the SET does not send WLAN AP information within the Multiple Location IDs. |
| Supported WLAN Information | O | This parameter provides a map of flags indicating which WLAN AP information the SET may send for a current serving WLAN AP in the Location ID parameter. It also indicates which WLAN AP information the SET may send in the Multiple Location IDs parameter when WLAN is set to "true": <br> AP transmit power <br> AP antenna gain <br> AP signal to noise received at the SET <br> Device type (802.11a/b/g) <br> AP signal strength at the SET <br> AP channel/frequency of TX/RX <br> Round trip delay between SET and AP <br> SET transmit power• SET antenna gain <br> SET signal to noise received at the AP <br> SET signal strength at AP <br> AP location as reported by AP |
| GSM | M | The value of this parameter is "true" or "false". If "true", it indicates the SET is allowed to send GSM information as part of Location ID within Multiple Location IDs. If "false", the SET does not send GSM information within Multiple Location IDs. |
| WCDMA | M | The value of this parameter is "true" or "false". If "true", it indicates the SET is allowed to send WCDMA information as part of Location ID within Multiple Location IDs. If "false", the SET does not send WCDMA information within Multiple Location IDs. |
| Supported WCDMA Information | CV | This parameter provides a map of flags indicating which WCDMA network measurements the SET may send for the current serving cell in the Location ID parameter. It also indicates which WCDMA network measurements the SET may send in the Multiple Location IDs parameter when WCDMA is set to "true": <br> MRL (Measured Results List) |
| CDMA | M | The value of this parameter is "true" or "false". If "true", it indicates the SET is allowed to send CDMA information as part of Location ID within Multiple Location IDs. If "false", the SET does not send CDMA information within Multiple Location IDs. |
| Historic | M | The value of this parameter is "true" or "false". If "true", it indicates the SET is allowed to send historic information as part of Location ID within Multiple Location IDs. If "false", the SET does not send historic information within Multiple Location IDs. |
| Non-serving | M | The value of this parameter is "true" or "false". If "true", it indicates the SET is allowed to send information for non-serving as well as serving cells and WLAN APs as part of Location ID within Multiple Location IDs. If "false", the SET may only send information for serving cells or serving WLAN APs within Multiple Location IDs. |

FIG. 11 shows a design of a process 1100 performed by a terminal/SET for positioning in SUPL. Supported network information may be received from an SLP (block 1112). The supported network information may be for any type of radio access network (e.g., WLAN, CDMA, WCDMA, GSM, etc.) and may comprise any of the information shown in Table 8 and/or other information. Network measurement information may be obtained for a radio access network (block 1114). Which particular network measurement information (or which network measurements) for the radio access network to send to the SLP may be determined based on the supported network information (block 1116). Network measurement information permitted by the supported network information may be sent to the SLP (block 1118).

For a network-initiated SUPL session, the supported network information may be received in a SUPL INIT message, and the network measurement information permitted by the supported network information may be sent in a SUPL POS INIT message, e.g., as shown in FIG. 10A. For a SET-initiated SUPL session, the supported network information may be received in a SUPL RESPONSE message or a SUPL TRIGGERED RESPONSE message, and the network measurement information permitted by the supported network information may be sent in a SUPL POS INIT message, e.g., as shown in FIG. 10B.

FIG. 12 shows a design of a process 1200 performed by an SLP to support positioning in SUPL. Supported network information may be sent from the SLP to a SET (block 1212). Network measurement information permitted by the supported network information may be received from the SET (block 1214). Location information (e.g., a location estimate) for the SET may be determined based on the network measurement information received from the SET (block 1216).

Figure 13:
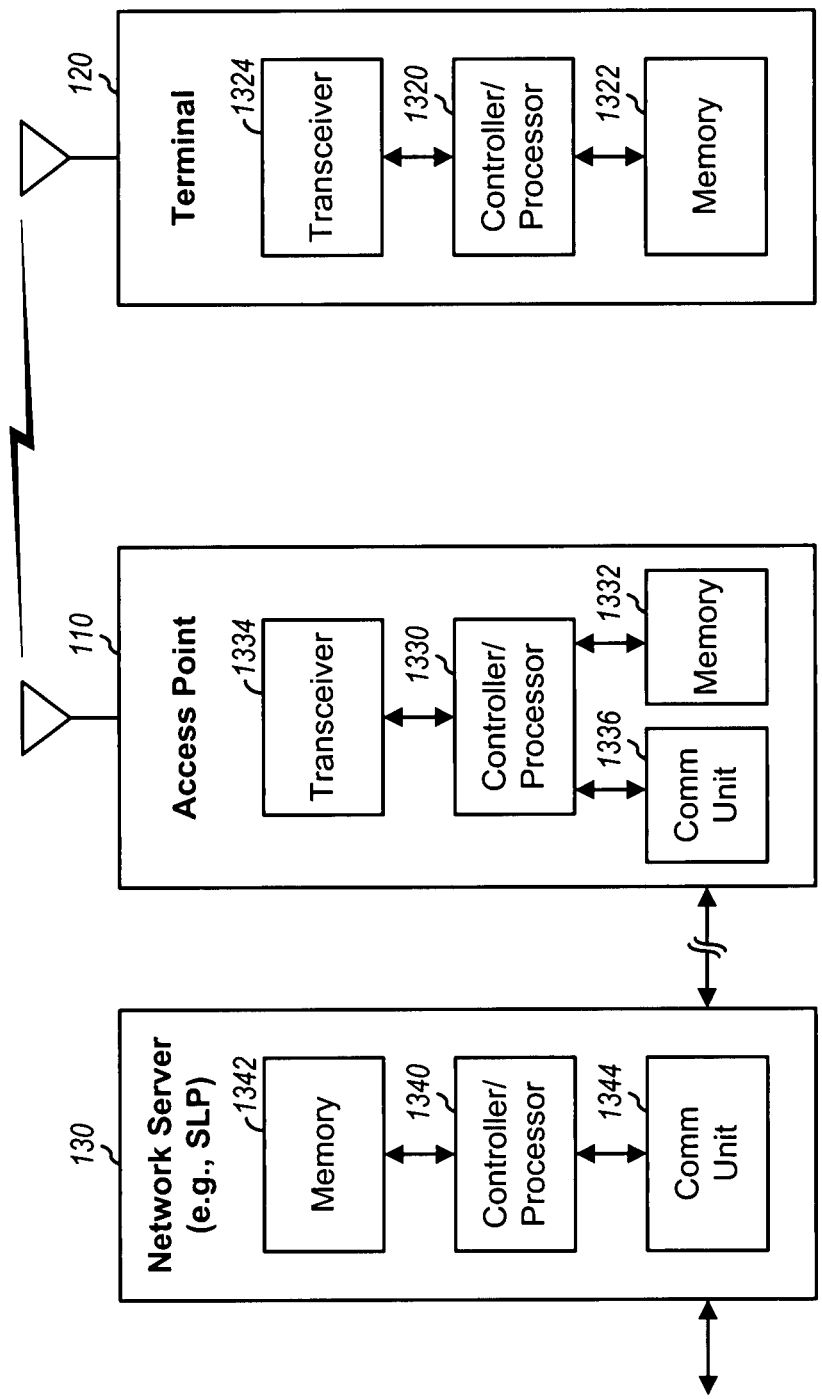
FIG. 13 shows an access point, a terminal, and a network server.

FIG. 13 shows a block diagram of one access point 110, one terminal 120, and network server 130 in FIG. 1. Network server 130 may be SLP 530 in FIG. 5, SLP 930 in FIG. 9, or some other location server. For simplicity, FIG. 13 shows only one controller/processor 1320, one memory 1322, and one transceiver 1324 for terminal 120, only one controller/processor 1330, one memory 1332, one transceiver 1334, and one communication (Comm) unit 1336 for access point 110, and only one controller/processor 1340, one memory 1342, and one communication unit 1344 for network server 130. In general, each entity may include any number of processors, controllers, memories, transceivers, communication units, etc. Terminal 120 may support wireless communication with one or more wireless networks, e.g., WLAN, GSM, WCDMA, and/or CDMA networks. Terminal 120 may also receive and process signals from one or more satellite positioning systems, e.g., GPS, Galileo, etc.

On the downlink, access point 110 transmits traffic data, signaling, and pilot to terminals within its coverage area. These various types of data are processed by processor 1330 and conditioned by transceiver 1334 to generate a downlink signal, which is transmitted via an antenna. At terminal 120, the downlink signals from one or more access points are received via an antenna, conditioned by transceiver 1324, and processed by processor 1320 to obtain various types of information. For example, transceiver 1324 and/or processor 1320 may make various measurements for any of the WLAN positioning methods described above. Processor 1320 may perform process 700 in FIG. 7, process 1100 in FIG. 11, and/or other processes for positioning. Memories 1322 and 1332 store program codes and data for terminal 120 and access point 110, respectively.

On the uplink, terminal 120 may transmit traffic data, signaling, and pilot to one or more access points in WLAN 100. These various types of data are processed by processor 1320 and conditioned by transceiver 1324 to generate an uplink signal, which is transmitted via the terminal antenna. At access point 110, the uplink signals from terminal 120 and other terminals are received and conditioned by transceiver 1334 and further processed by processor 1330 to obtain various types of information from the terminal. Access point 110 may directly or indirectly communicate with network server 130 via communication unit 1336.

Within network server 130, processor 1340 performs processing for any of the WLAN positioning methods described above. For example, processor 1340 may perform process 800 in FIG. 8, process 1200 in FIG. 12, and/or other processes to support positioning. Process 1340 may also build and maintain databases for various WLAN positioning methods, provide location information to terminals, compute location estimates for terminals and/or access points, etc. Memory 1342 stores program codes and data for network server 130. Communication unit 1344 allows network server 130 to communicate with access point 110 and/or other network entities.

The techniques described herein may be implemented by various means. For example, these techniques may be implemented in hardware, firmware, software, or a combination thereof. For a hardware implementation, the processing units used to perform positioning at a station (e.g., a terminal, an access point, or some other entity) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc) that perform the functions described herein. The firmware and/or software codes may be stored in a memory (e.g., memory 1322, 1332 or 1342 in FIG. 13) and executed by a processor (e.g., processor 1320, 1330 or 1340). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus supporting Secure User Plane Location (SUPL), comprising:
   a processor configured to:
   determine access point (AP) information of an AP in a wireless local area network (WLAN) and cellular network information of a cellular network;
   filter the AP information based on network measurement information that is supported by a SUPL Location Platform (SLP), wherein the network measurement information that is supported by the SLP is included as a first SUPL message parameter in a first SUPL message received from the SLP;
   send a second SUPL message to the SLP, wherein the second SUPL message includes the filtered AP information; and receive a third SUPL message from the SLP, wherein the third SUPL message includes location information that is determined based on the filtered AP information and that is associated with a location of a SUPL Enabled Terminal (SET); and memory coupled to the processor.

2. The apparatus of claim 1, wherein the processor is further configured to obtain measurements for signal strength and a signal-to-noise ratio (S/N) for the AP, and wherein the processor determines the AP information based on the measurements.

3. The apparatus of claim 1, wherein the processor is further configured to receive measurements for signal strength or signal-to-noise ratio (S/N) made by the AP for the SET, and wherein the processor determines the AP information based on the measurements.

4. The apparatus of claim 1, wherein the first SUPL message includes a SUPL INIT message, and wherein the second SUPL message includes a SUPL POS INIT message.

5. The apparatus of claim 1, wherein the second SUPL message includes a SUPL START message, a SUPL POS INIT message, or a SUPL TRIGGERED START message.

6. The apparatus of claim 1, wherein the network measurement information that is supported by the SLP includes at least one of an AP transmit power, an AP antenna gain, an AP signal-to-noise ratio (S/N), an AP signal strength, an AP channel or frequency, an AP reported location, and a device type for the AP.

7. The apparatus of claim 1, wherein the network measurement information that is supported by the SLP includes at least one of a SET transmit power, a SET antenna gain, a SET signal-to-noise ratio (S/N), or a SET signal strength for the SET.

8. A method of supporting Secure User Plane Location (SUPL), comprising:
receiving network measurement information that is supported by a SUPL Location Platform (SLP), wherein the network measurement information that is supported by the SLP is included as a first SUPL message parameter in a first SUPL message received from the SLP;
determining access point (AP) information of an AP in a wireless local area network (WLAN) and cellular network information of a cellular network;
filtering the AP information based on the network measurement information that is supported by the SLP;
sending a second SUPL message to the SLP, wherein the second SUPL message includes the filtered AP information; and
receiving a third SUPL message from the SLP, wherein the third SUPL message includes location information that is determined based on the filtered AP information and that is associated with a location of a SUPL Enabled Terminal (SET).

9. The method of claim 8, wherein the determining the AP information comprises obtaining measurements for signal strength, a signal-to-noise ratio (S/N), or a round trip delay (RTD) for the AP, and determining the AP information based on the measurements.

10. The method of claim 8, wherein the determining the AP information comprises receiving measurements for signal strength or a signal-to-noise ratio (S/N) made by the AP for the SET, and determining the AP information based on the measurements.

11. The method of claim 8, wherein the second SUPL message includes a SUPL START message, a SUPL POS INIT message, or a SUPL TRIGGERED START message.

12. An apparatus supporting Secure User Plane Location (SUPL), comprising:
a processor configured to:
transmit a first SUPL message from a SUPL Location Platform (SLP) to a SUPL Enabled Terminal (SET) in a wireless local area network (WLAN), wherein the first SUPL message includes a first SUPL message parameter that identifies network measurement information that is supported by the SLP;
receive a second SUPL message from the SET, wherein the second SUPL message includes filtered access point (AP) information of an AP in the WLAN, wherein the AP information is filtered based on the network measurement information that is supported by the SLP;
determine location information for the SET based on the filtered AP information; and
transmit a third SUPL message from the SLP to the SET, wherein the third SUPL message includes the location information to the SET; and
a memory coupled to the processor.

13. The apparatus of claim 12, wherein the first SUPL message includes a SUPL INIT message, and wherein the second SUPL message includes a SUPL POS INIT message.

14. The apparatus of claim 12, wherein the second SUPL message includes a SUPL START message or a SUPL POS INIT message.

15. The apparatus of claim 12, wherein the network measurement information that is supported by the SLP includes at least one of an AP transmit power, an AP antenna gain, an AP signal-to noise ratio (S/N), an AP signal strength, an AP channel or frequency, an AP reported location, or a device type for the AP.

16. The apparatus of claim 12, wherein the network measurement information that is supported by the SLP includes at least one of a SET transmit power, a SET antenna gain, a SET signal-to-noise ratio (S/N), or a SET signal strength for the SET.

17. A method of supporting Secure User Plane Location (SUPL), comprising:
transmitting a first SUPL message from a SUPL Location Platform (SLP) to a SUPL Enabled Terminal (SET) in a wireless local area network (WLAN), wherein the first SUPL message includes a first SUPL message parameter that identifies network measurement information that is supported by the SLP;
receiving a second SUPL message from the SET, wherein the second SUPL message includes filtered access point (AP) information of an AP in the WLAN, wherein the AP information is filtered based on the network measurement information that is supported by the SLP;
determining location information for the SET based on the filtered AP information; and
transmitting a third SUPL message from the SLP to the SET, wherein the third SUPL message includes the location information to the SET.

18. The method of claim 17, wherein the second SUPL message includes a SUPL START message, a SUPL POS INIT message, or a SUPL TRIGGERED START message.

19. An apparatus supporting Secure User Plane Location (SUPL), comprising:
means for receiving a first SUPL message from a SUPL Location Platform (SLP), wherein the first SUPL message includes a first SUPL message parameter that identifies network measurement information that is supported by the SLP;

means for determining access point (AP) information of an AP in a wireless local area network (WLAN) and cellular network information of a cellular network;

means for filtering the AP information based on the network measurement information that is supported by the SLP; and means for sending a second SUPL message to the SLP, wherein the second SUPL message includes the filtered AP information; and means for receiving a third SUPL message from the SLP, wherein the third SUPL message includes location information that is determined based on the filtered AP information and that is associated with a location of a SUPL Enabled Terminal (SET).

20. A non-transitory computer-readable medium comprising processor-readable instructions configured to cause a processor to:

receive network measurement information that is supported by a secure user plane location (SUPL) Location Platform (SLP), wherein the network measurement information that is supported by the SLP is included as a first SUPL message parameter in a first SUPL message received from the SLP;

determine access point (AP) information of an AP in a wireless local area network (WLAN) and cellular network information of a cellular network;

filter the AP information based on the network measurement information that is supported by the SLP;

send a second SUPL message to the SLP, wherein the second SUPL message includes the filtered AP information; and receive a third SUPL message from the SLP, wherein the third SUPL message includes location information that is determined based on the filtered AP information and that is associated with a location of a SUPL Enabled Terminal (SET).

21. The apparatus of claim 1, wherein the AP information comprises round trip delay (RTD) between the SET and the AP in the WLAN.

22. The apparatus of claim 1, wherein the first SUPL message further includes a second SUPL message parameter that identifies a WLAN positioning method.

23. The apparatus of claim 1, wherein the network measurement information that is supported by the SLP is included in a location identifier (ID) parameter of the first SUPL message.

24. The apparatus of claim 1, wherein the network measurement information that is supported by the SLP is included in a multiple location identifiers (IDs) parameter of the first SUPL message.

* * * * *